United States Patent
Okano

(10) Patent No.: US 10,933,371 B2
(45) Date of Patent: *Mar. 2, 2021

(54) GAS RECOVERY AND CONCENTRATION DEVICE

(71) Applicant: SEIBU GIKEN CO., LTD., Fukuoka (JP)

(72) Inventor: Hiroshi Okano, Fukuoka (JP)

(73) Assignee: SEIBU GIKEN CO., LTD., Fukuoka (JP)

(\*) Notice: Subject to any disclaimer, the term of this patent is extended or adjusted under 35 U.S.C. 154(b) by 0 days.

This patent is subject to a terminal disclaimer.

(21) Appl. No.: 16/493,647

(22) PCT Filed: Jun. 7, 2018

(86) PCT No.: PCT/JP2018/021887
§ 371 (c)(1),
(2) Date: Sep. 12, 2019

(87) PCT Pub. No.: WO2019/012873
PCT Pub. Date: Jan. 17, 2019

(65) Prior Publication Data
US 2020/0001233 A1    Jan. 2, 2020

(30) Foreign Application Priority Data

Jul. 11, 2017 (JP) .............................. JP2017-135113

(51) Int. Cl.
*B01D 53/06* (2006.01)
*B01J 20/28* (2006.01)
(Continued)

(52) U.S. Cl.
CPC ........... *B01D 53/83* (2013.01); *B01D 53/025* (2013.01); *B01D 53/06* (2013.01); *B01D 53/62* (2013.01);
(Continued)

(58) Field of Classification Search
CPC ...... B01D 53/04; B01D 53/025; B01D 53/06; B01D 53/62; B01D 53/83; B01D 53/96;
(Continued)

(56) References Cited

U.S. PATENT DOCUMENTS

| 10,406,475 B2* | 9/2019 | Okano .................. B01D 53/06 |
| 2001/0009124 A1* | 7/2001 | Suzuki .................. B01D 53/06 |
| | | 95/113 |

(Continued)

FOREIGN PATENT DOCUMENTS

| JP | 61-254220 | 11/1986 |
| JP | 63-252528 | 10/1988 |

(Continued)

OTHER PUBLICATIONS

Machine Generated English translation of JP 2016-117052 A, published Jun. 30, 2016.*

(Continued)

*Primary Examiner* — Frank M Lawrence, Jr.
(74) *Attorney, Agent, or Firm* — Staas & Halsey LLP

(57) ABSTRACT

An energy efficient and durable thermal swing type carbon dioxide recovery and concentration device can be made smaller and use low-temperature heat waste of 100° C. or less. A honeycomb rotor carries adsorption particles having a sorption capacity for carbon dioxide. The rotor is rotated in a sealed casing divided into at least an sorption zone and a desorption zone and is brought into contact with material gas that contains carbon dioxide in a state wherein the honeycombs in the sorption zone are moist so as to adsorb the carbon dioxide while carrying out evaporative cooling of water. Then, the honeycombs that have adsorbed the carbon dioxide are moved to the desorption zone and brought into contact with low pressure vapor so as to desorb high concentration carbon dioxide. Thus, it is possible to con- (Continued)

tinuously recover carbon dioxide at a high recovery rate and high concentration.

17 Claims, 18 Drawing Sheets

(51) Int. Cl.

| | | |
|---|---|---|
| *B01D 53/83* | (2006.01) | |
| *B01J 49/10* | (2017.01) | |
| *B01J 41/07* | (2017.01) | |
| *B01J 47/11* | (2017.01) | |
| *B01J 49/57* | (2017.01) | |
| *C01B 32/50* | (2017.01) | |
| *B01D 53/02* | (2006.01) | |
| *B01D 53/62* | (2006.01) | |
| *B01D 53/96* | (2006.01) | |
| *B01J 20/26* | (2006.01) | |
| *B01J 20/34* | (2006.01) | |
| *B01J 41/12* | (2017.01) | |

(52) U.S. Cl.
CPC ............. *B01D 53/96* (2013.01); *B01J 20/26* (2013.01); *B01J 20/28004* (2013.01); *B01J 20/28026* (2013.01); *B01J 20/3466* (2013.01); *B01J 41/07* (2017.01); *B01J 41/12* (2013.01); *B01J 47/11* (2017.01); *B01J 49/10* (2017.01); *B01J 49/57* (2017.01); *C01B 32/50* (2017.08); B01D 2252/204 (2013.01); B01D 2253/206 (2013.01); B01D 2253/25 (2013.01); B01D 2253/304 (2013.01); B01D 2253/3425 (2013.01); B01D 2257/504 (2013.01)

(58) Field of Classification Search
CPC ........ B01D 2252/204; B01D 2253/206; B01D 2253/25; B01D 2253/304; B01D 2253/311; B01D 2253/3425; B01D 2257/504; B01D 2259/40056; B01D 2259/4009; B01J 20/22; B01J 20/26; B01J 20/28004; B01J 20/28026; B01J 20/20845; B01J 20/3466; B01J 41/07; B01J 41/12; B01J 47/11; B01J 47/127; B01J 49/10; B01J 49/57; C01B 32/50; Y02C 20/40; Y02P 20/129; Y02P 20/151; Y02P 20/50

USPC ............. 96/125, 126, 130, 145; 95/139, 113
See application file for complete search history.

(56) References Cited

U.S. PATENT DOCUMENTS

| | | | |
|---|---|---|---|
| 2003/0019357 A1* | 1/2003 | Tanaka .................. | B01D 53/40 95/113 |
| 2012/0000365 A1* | 1/2012 | Okano .................. | B01D 53/06 96/144 |
| 2014/0175336 A1* | 6/2014 | Gupta .................. | B01D 53/06 252/373 |
| 2014/0241968 A1 | 8/2014 | Wennergren et al. | |
| 2015/0007727 A1* | 1/2015 | Elliott .................. | B01D 53/06 95/139 |
| 2016/0136565 A1 | 5/2016 | Okumura et al. | |
| 2016/0175772 A1 | 6/2016 | Maruyama et al. | |
| 2016/0271556 A1 | 9/2016 | Okano | |

FOREIGN PATENT DOCUMENTS

| | | |
|---|---|---|
| JP | 4-83509 | 3/1992 |
| JP | 6-91128 | 4/1994 |
| JP | 2001-205045 | 7/2001 |
| JP | 2003-181242 | 7/2003 |
| JP | 2004-344703 | 12/2004 |
| JP | 2015-507527 | 3/2015 |
| JP | 2016-117052 | 6/2016 |
| JP | 2016-175014 | 10/2016 |
| WO | WO 2014/208038 | 12/2014 |

OTHER PUBLICATIONS

International Search Report dated Jul. 10, 2018 in corresponding International Patent Application No. PCT/JP2018/021887.
Written Opinion of the International Searching Authority dated Jul. 10, 2018 in corresponding International Patent Application No. PCT/JP2018/021887.
Yosuke Matsukuma et al., "Study on Optimization of a $CO_2$ Recovery System from Flue Gas by Use of Honeycomb-Type Adsorbent", Chemical Engineering Collected Papers, vol. 33, 2007, pp. 218-229.

* cited by examiner

GAS RECOVERY AND CONCENTRATION DEVICE

CROSS REFERENCE TO RELATED APPLICATIONS

This application is a U.S. National Stage Application, which claims the benefit under 35 U.S.C. § 371 of International Patent Application No. PCT/JP2018/021887 filed Jun. 7, 2018, which claims the foreign priority benefit under 35 U.S.C. § 119 of Japanese Patent Application No. 2017-135113 filed Jul. 11, 2017, the contents of which are incorporated herein by reference.

BACKGROUND

The inventor's work relates to a carbon dioxide recovery concentration device of thermal swing type, which can collect carbon dioxide by a high recovery rate, and can condense the carbon dioxide to high concentration. Also, the proposal described below can make the device miniaturize. Further, the device can have a high endurance, can utilize waste heat 100° C. or less. Nevertheless, the device needs little consumption energy.

As measures against global warming, efforts to reduce carbon dioxide emitted from industry, a car, and a home are made on the world level. For example of the effort, a device which consumes energy is improved so that it may become a saving energy type, and an old device is replaced by the improved device. Also, as a device for generating energy such as power plants, a device which utilizes a renewable energy as sunlight or wind power is adapted, and an improvement for raising a power generation efficiency of a thermal power plant is performed. In addition, research and development in the art which recovers concentration of the carbon dioxide emitted from a thermal power plant and stores the carbon dioxide in underground or under deep sea in the future, etc., are conducted.

In the above measures, especially the proposal relates to the art which collects carbon dioxide from gas discharged from a thermal power plant, a combustion furnace, etc., to condense it.

As a thermal power plant, the plants which use oil, natural gas and coal for fuel has spread most, and there are some other plants which incinerate the garbage discharged from cities. Some which use coal as fuel in such a thermal power plant have the following features. That is, since the coal is cheap, there are many global deposits of the coal farther than oil and a burying place of the coal is also in every corner of the earth, the coal is easy to obtain, therefore, the thermal power plant can stabilize to supply electric power.

However, the coal has the problem that much carbon dioxide is emitted from the coal at the time of combustion as compared with oil or natural gas, and also coal has a sulfide. Not only coal but also heavy oil has the same problem as coal. For this reason, in the plant which uses coal or heavy crude oil as fuel, a device by which SOx and nitrogen oxide are removed is mounted, and environmental pollution is prevented.

However, even if SOx and nitrogen oxide are removed and it prevents environmental pollution, since carbon dioxide is still emitted so much, there is a problem of promoting global warming.

Research and development in the technology of separation, recovery and concentration of the carbon dioxide in exhaust gas and storing the collected carbon dioxide in underground or deep sea as this remedy are done. For separation recovery concentrating of carbon dioxide, a deep freeze method, the absorbing method, an adsorption process, a film separation method, etc., are proposed variously.

The deep freeze method is the one for pressurizing material gas and the method carries out liquefaction and separation of the carbon dioxide using a difference of the liquefaction temperature of each gas under pressurization. In this method, the electric power of the compressor which compresses gas and the electric power of the freezer which carries out deep freeze are required. For example, in a case where carbon dioxide levels are just over or below 10%, since the deep freeze and the compression are also performed for the 90% remaining gas which does not need to be collected except for carbon dioxide, this method has such a disadvantage that energy expenditure becomes excessive.

The method of desorbing carbon dioxide and condensing by the absorbing method making the alkaline fluid of an amine system, such as monoethanolamine, absorb carbon dioxide, collecting them, and heating, is already put in practical use. An expensive corrosion-resistant material is required for this method by dealing with alkaline fluid, and, so, it is high cost. The concentration of amine solution is just over or below 30%. That is, 70% order is water and the calorific capacity of the fluid to deal with is huge. For this reason, even if it arranges and carries out heat recollection of the heat exchanger to the key point, the limit of energy saving is approached. Further, since monoethanolamine is the steam-ized medicine, it has a problem anxious also about the secondary contamination exhausted in the atmosphere.

An adsorption process uses gas adsorption material, such as zeolite and activated carbon. There are a pressure swing method (the henceforth, PSA method) that is use a difference of pressure between adsorption and desorption, and a thermal swinging method (the henceforth, TSA method) that adsorbed and desorbed using a temperature difference. The PSA method uses the principle which changes the amount of adsorption of carbon dioxide with pressure. It pressurizes first and makes only carbon dioxide adsorb. Next, since it is the method of decompressing and carrying out desorption separation recovery of the carbon dioxide, a capacity-to-resist-pressure container is required. Precision instruments, such as an electromagnetic valve, a compressor, a vacuum pump, are also needed as peripheral equipment, and there is a problem that enlargement is difficult.

The TSA method is the method of making carbon dioxide adsorb at the temperature below Centigrade 50° C. (let all temperature be "Centigrade" henceforth), heating in temperature of around 100-200° C., making desorb carbon dioxide, and collecting. In the multiple bed type which changes by turns a plurality of adsorption towers filled up with carbon dioxide adsorption material to adsorption and reproduction, the pressure loss of gas is high and variation in the concentration by the change of a tower and pressure is not avoided. There is which fault with difficult enlargement.

Also in the TSA method, the possible method of formation of a low-pressure power loss or enlargement is shown to, Patent Document 3, JP 2001-205045A, Patent Document 4, JP 2003-181242A, and Patent Document 5, JP 2004-344703A, by using a rotated type adsorption honeycomb rotor. However, it is insufficient in respect of the energy-saving nature of the recovery rate of carbon dioxide, concentrated concentration, and recovery energy.

SUMMARY

The invention can relate to a carbon dioxide recovery condensation method, and can be collected by a high recovery rate, and it can condense to high concentration, and can miniaturize, and endurance is high, around 100° C. waste heat can be used for reproduction, and a thermal swing carbon dioxide recovery concentration device with little consumption energy is proposed.

The rotor of the cylindrical shape-like container which divided granular carbon dioxide adsorption material into the bucket-like container, and stored it is used for what was indicated by Patent Document 1, Japanese Patent Publication No. 1992-83509A and Patent Document 2, Japanese Patent Publication No. 1994-91128A. The method of rotating a rotor, or rotating a duct device, adsorbing carbon dioxide in an adsorption zone, and carrying out desorption recovery of the high-concentration carbon dioxide with heating gas in a desorption zone is shown in this literature.

As to the above disclosed technology, the pressure loss of gas is high and energy-saving nature is not taken into consideration, either. Although the method of using the heat of material gas for the heat source of the desorption gas of carbon dioxide is disclosed in the Patent Document 2, it is not taken into consideration about the energy-saving nature of the recovery concentration device itself.

In the Patent Document 3, a rotor of honeycomb structure is proposed, and the rotor makes reduction of pressure loss. Also, the Patent Document 3 disclosed a flow chart that the rotor passes an adsorption zone, a desorption zone by heating carbon dioxide gas, a gas purge zone, and a reproduction cooling zone (hereinafter described "cooling zone") sequentially with rotation to return to the absorption zone again. In the stage of passing through the desorption zone and moving to the next zone, when the high concentration carbon dioxide gas included in a honeycomb opening is moved to the next zone with the rotation of the rotor. If the next zone is the cooling zone, high concentration gas is emitted into coolant gas and, as a result, it reduces a carbon dioxide recovery rate. The purge zone is provided as this measure.

Since the honeycomb is still hot by thermal storage after passing the desorption zone and the next purge zone, adsorption power of carbon dioxide is weak. Therefore, carbon dioxide gas will flow out without being adsorbed if material gas flows here. Then, the honeycomb is constituted so that it moves to the adsorption zone after cooling the honeycomb by providing a cooling zone in front of the adsorption zone. It is described in the document that the recovery rate of carbon dioxide can be improved thereby.

In the desorption zone, a circulation circuit between a gas heating coil and the desorption zone is constituted and recovery use of the heat of the high temperature gas discharged from a boiler, etc., is carried for energy-saving purposes. Also, in the cooling zone, the circulation circuit between a gas cooling coil and a cooling zone is constituted to increase cooling effect. However, since there are many each amounts of circulating gas, there is a disadvantage that a more large sized honeycomb rotor is required.

In the Patent Document 4, it is proposed that a boiler, a desulfurization facility, an eliminator, a honeycomb rotor dehumidifier system, and a honeycomb rotor carbon dioxide recovery concentration device are integrated as a system. That is, overall system optimization is proposed in the document. However, as to a carbon dioxide recovery concentration device, the whole system does not have the unobviousness above the technology in the Patent Document 3.

The Patent Document 5 disclosed that an X type zeolite of the range of 2-2.5 of $SiO_2/Al_2O_3$ ratio which uses Li, Mg, Na, Ca, and Sr as a cation utilizes as adsorption material of a carbon dioxide adsorption rotor. However, as to a carbon dioxide concentration device, there is no unobviousness above the technology in the Patent Document 3.

The carbon dioxide recovery concentration device disclosed in the drawing 1 of the Non-Patent Literature 1, "Study on Optimization of a CO2 Recovery System from Flue Gas by Use of Honeycomb-Type Adsorbent" chemical engineering collected papers, the 33rd volume, pp. 218-229-2007, has a relation to the Patent Documents 3-5, and the device makes carbon dioxide adsorption honeycomb rotor 1 rotate by a rotor drive belt (or chain) 3 engaged with a rotor drive motor 2 at a speed of several rotations to tens of turns per hour. The device has a cycle which returns to adsorption zone 4 through adsorption zone 4, desorption zone 5, gas purge zone 6 and cooling zone 7 along a direction of rotation of the rotor 1. In the device, a circulation circuit is constituted during cooling zone 7, gas cooling coil 8 and coolant gas blower 9. Similarly, a circulation circuit is constituted during desorption zone 5, desorption gas heating coil 10 and desorption gas circulation blower 11.

A structure of the carbon dioxide recovery concentration system disclosed in the Patent Documents 3-5 and the Non-Patent Literature 1 is explained as follows. Since flue gas is high temperature and high humidity and contains polluted gas such as SOx, nitrogen oxide and particulates, the system is provided with a pretreatment system such as NOx removal equipment, wet scrubber, a desulfurization facility and a bug filter which are disclosed in the Patent Document 4. The pretreatment system removes the harmful gas and the particulates. Since a honeycomb rotor which supports zeolite system adsorption material is used for carbon dioxide concentration, the zeolite adsorbs vapor preferentially rather than carbon dioxide and the carbon dioxide adsorption capability of the system declines. Therefore, it is necessary to dehumidify the flue gas at dew point temperature minus 20 to minus 60° C. in the pretreatment process with a honeycomb rotor dehumidifier to introduce the flue gas to the system as disclosed in the Patent Document 4.

An operation of the above system as related art is explained below. The material gas which pretreated the flue gas is introduced into the adsorption zone 4. The concentration of the carbon dioxide decreases after a honeycomb adsorbs carbon dioxide in the flue gas in the adsorption zone 4 and the flue gas is introduced to mix with the exit air of cooling zone 7. The mixed gas passes to be cooled by cooling gas circulation blower 9 through gas cooling coil 8, and is introduced into the cooling zone 7. In the cooling zone 7, by rotating of the rotor to shift from desorption zone 5 to purge zone 6, the honeycomb is cooled to recover the adsorption capability of honeycomb which has not yet recovered its carbon dioxide adsorption capability for high temperature.

The adsorption of carbon dioxide proceeds even in the cooling zone 7. As to the circulating gas in the cooling zone 7, a capacity of the gas except the collected carbon dioxide from the material gas introduced from the adsorption zone 4 serves as a surplus, and the surplus gas is exhausted outside of the system and is discharged into the atmosphere.

In a desorption gas circulation circuit, high concentration carbon dioxide gas is introduced into desorption zone 5 after being heated at 140 to 220° C. by a desorption gas heating coil 10, and the heated gas heats the honeycomb to desorb the carbon dioxide which is adsorbed to the honeycomb. That is, the gas which comes out of the desorption zone 5 returns to the desorption gas heating coil 10 to circulate again in desorption gas circulation blower 11, the gas in a circulation circuit increases by the desorbed carbon dioxide gas, and parts for the capacity which are increased are taken out outside the circulation circuit to be collected. This method is difficult to desorb the carbon dioxide fully since the heated carbon dioxide gas desorbs the carbon dioxide gas. This also causes rotor enlargement.

In a honeycomb rotor dehumidifier or a honeycomb rotor organic solvent concentration device, heated air is introduced into a desorption zone to desorb vapor which is adsorbed to a honeycomb or VOC by air as carrier gas. However, when carrier gas is used with a carbon dioxide concentration device, recovery carbon dioxide levels will be reduced. Therefore, high concentration carbon dioxide gas is used for desorption. A completely different view from a honeycomb rotor dehumidifier or a honeycomb rotor organic solvent concentration device is needed.

In the purge zone 6, the high concentration carbon dioxide gas included in the opening of the honeycomb which has been rotated to move from the desorption zone 5 is purged to return to the desorption zone 5 so that a spill of the carbon dioxide is collected is prevented. Although a part of coolant gas is used for purge gas, it is also possible to use material gas. By this gas purge, there is an advantage which improves a carbon dioxide recovery rate.

If the quantity of the purge gas is further increased, desorption of adsorbed matter will be promoted in the gas purge zone 6 using preheating, and there is an energy saving effect by carrying out heat recollection in purge zone 6 to reuse in desorption zone 5. This flow chart is used abundantly with a rotor type dehumidifier and a rotor type organic solvent concentration device. However, since gas with low carbon dioxide levels is introduced into a desorption circuit and reduces carbon dioxide recovery concentration in a case where a carbon dioxide concentration apparatus is targeted, the usage of increasing the quantity of the purge gas to achieve the energy-saving effect is not realized.

As another problem, in order to cool the honeycomb immediately after reproduction and to remove the heat of adsorption which occurred by the adsorption of carbon dioxide at the time of cooling zone passage in a cooling zone, 4 to 6 times as much circulation coolant gas as processing gas volume must be passed. Thus, there is a disadvantage that the power consumption of the amount of cold water or circulation blower supplied to a syngas cooler is large, and a rotor is enlarged.

Also, since the double amount of desorption gas as the amount of material gas must be circulated, as compared with the diameter of a rotor of a honeycomb rotor organic solvent concentration device shown in Table 1, it has the problem that 5 or more times is needed in volume, and the large sized rotor of 2.2 times or more is needed for a rotor diameter to the same processing (materials) gas volume.

TABLE 1

| | Diameter comparison against process air flow (Flow rate: Nm³/h) | | | |
|---|---|---|---|---|
| | Dehumidifier | VOC concentrator | Conventional $CO_2$ concentrator | $CO_2$ concentrator of the present invention |
| Zone ratio Desorption:Cooling:Process | 1:1:3 | 1:1:10 | 2.5:5:1 | 1:0.5:10 |
| Flow volume/process | 70,000 | 70,000 | 70,000 | 70,000 |
| Flow volume/desorption | 23,300 | 7,000 | 170,000 | 7,000 |
| Flow volume/purge | 23,300 | 7,000 | 700 | |
| Flow volume/cooling | | | 330,000 | |
| Total gas volume | 116,600 | 84,000 | 570,000 | 70,000 |
| Desorption temperature(° C.) | 140~220 | 180~200 | ~220 | 100 |
| Rotor diameter(m) | Φ 4.54 m | Φ 3.85 m | Φ 10.0 m | Φ 3.85 m |

As explained above, as to a carbon dioxide recovery concentration device, there are four subjects that a condensed concentration and a recovery rate simultaneously must be raised, the miniaturization of a rotor must be achieved and a consumption energy must be lowered dramatically. Like the previously explained, the big subject how a honeycomb is effectively cooled for the miniaturization and the high performance of the carbon dioxide recovery concentration device. Although it is common sense that performance improvement can be carried out by providing a purge zone and precooling a honeycomb also with the organic solvent concentration device of a honeycomb rotor type and a dehumidifier, there is a necessity of considering a different thing in the level of the quantity of heat which must carry out cooling removal.

The first reason is a problem about adsorption capacity. Since it is necessary to adsorb high-concentration gas far from the organic solvent or vapor, the amount of adsorption material injections into the adsorption zone to the amount of the gas to be processed volume will be from several times to twelve times rather than an organic solvent concentration device or a dehumidifier. In other words, a rotor which has a volume several times from twelve times to a conventional device for the amount of material gas is needed. To compensate for it, there is a trial that adsorption throughput is increased by increasing a rotation speed of the rotor. For removing thermal storage of the honeycomb in which the desorption has finished, the purge chilling effect by material gas is quite insufficient. Therefore, a large cooling zone that is a number of times wide rather than the adsorption zone is provided, many times of the coolant gas of the absorption gas is circulated to cool.

The second reason is the problem about the heat of adsorption of carbon dioxide. If carbon dioxide is adsorbed from the gas which passes through the honeycomb, heat of adsorption is generated, and the adsorption power of adsorption material declines because the gas and the honeycomb raise their temperature by the heat of adsorption. Although the heat of adsorption of carbon dioxide is about from ⅙ to ⅐ of the heat of adsorption of vapor, in order to adsorb high-concentration carbon dioxide far as compared with an organic solvent concentration device or a honeycomb rotor dehumidifier, much heat of adsorption is generated. In a honeycomb rotor type dehumidifier, the problems can be resolved in a high humidity in two stages. In the first stage, a cooling type dehumidifier dehumidifies in advance. In the second stage, a honeycomb rotor dehumidifier dehumidifies. However, concerning to carbon dioxide concentration, the problems cannot be resolved by such a method as the two stages.

Therefore, even if the honeycomb is fully cooled in a cooling zone, carbon dioxide adsorption in an adsorption zone becomes insufficient and a recovery rate and the concentration of the carbon dioxide do not go up. For the above two reasons, in order to remove thermal storage and the heat of adsorption, a comparatively large cooling zone is provided, and circulation cooling is carried out. However, there are some problems in an increase of energy, an increase of a diameter of rotor for cooling and an upsizing of the whole device. The comparative examples of a honeycomb rotor type dehumidifier and a VOC concentration device are shown in Table 1.

As an analysis about both a test result and the simulation result of the Non-Patent Literature 1, the carbon dioxide recovery energy of a honeycomb rotor carbon dioxide recovery concentration device has increased about 15 times with an evaporation latent heat of 369.9 kJ/kg of the carbon dioxide considered to be a standard of carbon dioxide desorption energy, and about 80 to 90 percent of the thermal energy supplied to a desorption zone is considered to be supplied only for heating a honeycomb (a honeycomb substrate, an adsorption material and a binder which fixes the adsorption material). In a cooling zone, there is a vicious circle that energy expenditure increases in order to remove the huge thermal storage at this time as a nuisance.

In the absorbing method, material gas makes to have a contact with around 30% amine solution to make carbon dioxide absorbed. Since the 70% order of amine liquid is water, and, moreover, the density of water is about 800 times (1.251:1000 kg/m$^3$) the nitrogen which is the main ingredients of the material gas, specific heat is about 4 times (4.187:1.038 kJ/kg-k), the calorific capacity per volume has about 3200 times and very large calorific capacity, the absorption fever of carbon dioxide is absorbed into water and a rise in heat is quit fewer than the above adsorption type. Therefore, since there is little influence that the temperature of material gas and absorption liquid rises and the amount of absorption falls, most carbon dioxide in the gas is absorbable only by contacting material gas in absorption liquid once. This is a merit of the absorbing method. However, since the calorific capacity of absorption liquid is conversely huge, it is also a demerit that a loss by heating and cooling becomes large.

As a method for solving the above problems, the carbon dioxide recovery concentration technology of a fixed zone (floor) type for removing the carbon dioxide in a closed space such as a space station and a submarine is disclosed in the Patent Document 6, Japanese Patent Publication No. 1986-254220A. Gas to be processed is made to pass through an adsorption tower which accommodates carbon dioxide adsorption material of amine system ion-exchange resin or activated carbon, and the carbon dioxide is made to be adsorbed. Subsequently, by changing pipelines, an introduction of the vapor for heating is carried out and a desorption recovery of the carbon dioxide is carried out. The pipelines are again returned to the former connection after a desorption recovery of the carbon dioxide, and an object is achieved by the continuous cycle in which the gas to be processed passes to adsorb the carbon dioxide. It is also disclosed that the adsorption material is cooled at the time of adsorption of carbon dioxide by evaporation of the water condensed to adsorption material at the time of desorption, and the adsorption is promoted.

The carbon dioxide recovery concentration technology of mobile layer (floor) type is disclosed in the Patent Document 7, International Publication No. WO 2014/208038. Material gas is made to pass through the adsorption tower which accommodates carbon dioxide adsorption material to adsorb the carbon dioxide. After adsorbing, the adsorption material is moved to a regeneration tower and a desorption recovery of the carbon dioxide is carried out by heating with vapor. Furthermore, carbon dioxide adsorption material achieves an object by the continuous cycle in which the material moves to an adsorption tower again through a drying tower and adsorbs the carbon dioxide. It is also disclosed that the adsorption tower and the drying tower can be integrated to one.

In the Patent Document 8, Japanese Patent Publication No. 2015-507527, it is disclosed that material gas is introduced into a floor (layer) of the weakly basic ion exchange resin which has an amine group, the floor adsorbs the carbon dioxide in material gas. Also, it is disclosed that, at a desorption process, the temperature of carbon dioxide is raised and desorption recovery of the carbon dioxide is carried out by injecting warm water into the floor (layer) directly. Next, the temperature of carbon dioxide is decreased by injecting cold water into the floor (layer) directly, then, the next process returns to the process of introducing material gas again. That is, the method of collecting carbon dioxide continuously is disclosed in the document 8.

As to the method of the Patent Documents 3-5 and the Non-Patent Literature 1, a problem is disclosed that, due to a usage of carbon dioxide gas with little calorific capacity for the thermal catalyst for desorption, necessary quantity of the gas for desorption becomes huge and the device is upsized. The upsizing is avoided by the principles of using condensation latent heat of vapor in the Patent Documents 6 and 7 and by using warm water whose calorific capacity is about 500 times the carbon dioxide gas in the Patent Document 8.

Furthermore, in the method of the Patent Document 3-5 and the Non-Patent Literature 1, in order to cool the adsorption material after reproduction and to remove the heat of adsorption of carbon dioxide gas, the mixed gas with little calorific capacity is used. Thus, the amount of circulation of coolant gas becomes huge at a cooling process and an enlargement of the device is not avoided. In order to solve this problem, in the patent documents 6 and 7, the water condensed on the carbon dioxide adsorption material surface at the reproduction process is utilized for the evaporative cooling the heat of adsorption, which generates in the adsorption process of carbon dioxide, by evaporation of water, and also, in the Patent Document 8, the cooling process of pouring water directly is established after the reproduction process.

The inventor's proposal relates to a technology which carries out recovery concentration of carbon dioxide gas using solid amine system carbon dioxide adsorption material of non-water solubility and relates to a carbon dioxide gas recovery concentration device using a honeycomb rotor into which a sheet supported carbon dioxide sorption material particles was processed. A honeycomb rotor rotates inside of a sealed casing which is partitioned in at least two divisions of a sorption zone and a desorption zone. Material gas is introduced into the sorption zone and carbon dioxide in the gas is sorbed. The honeycomb which has sorbed carbon dioxide moves to the desorption zone by rotation of the rotor. In the desorption zone, the honeycomb is made to carry out introductory contact of the low-pressure vapor near the atmospheric pressure, the honeycomb is heated by the vapor, and carbon dioxide is made to desorb and is collected. The honeycomb which is made carbon dioxide gas desorb returns to the adsorption process again by rotation of the rotor.

The two phenomena of the adsorption and the absorption are different each other, however, they are substantially similar. If a phenomenon includes both of common elements in the two phenomena, a word "sorption" may be used. The ion-exchange resin has fine pores filled with water by water content. Also, it is considered that an inside of the fine pores is diffused and carbon dioxide adsorbs to an amine group on the surface of fine pores. The adsorption material which is attached by absorbents such as amine liquid and an ionic liquid in the fine pores of porous solid adsorption material is also contained in this. That is, in an operation principle, it is the main point that they are solid-like small diameter particles in non-water solubility.

Low-pressure vapor near the atmospheric pressure is fundamentally at atmospheric pressure, in order to make vapor containing high concentration carbon dioxide flow or to prevent from leaking the atmosphere and to prevent lump mixing, it is the pressure of a grade made into positive pressure, and it means pressure of about at most 100-2000 Pa. The low-pressure vapor is cooled and condensed on a honeycomb and a surface of the sorption material by heating of the honeycomb or desorption heat of carbon dioxide. Although the surface of sorption material returns to the adsorption zone in a state where it gets wet with water of vapor origin condensed in a desorption reproduction zone, an effect that carbon dioxide gas can be adsorbed efficiently by promoting cooling of adsorption material according to an evaporative cooling phenomenon of water and by carrying out removal cooling of the sorption heat of carbon dioxide gas is demonstrated.

As amine system carbon dioxide adsorption solid material of non-water solubility, adsorption material of which an amine system carbon dioxide absorbent or absorbents such as an ionic liquid attaches to an inside of the fine pores can also be used in addition to basic ion-exchange resin which has an amine group. In a case where an absorbent of which water enters in the fine pores of adsorption material, the water into fine pores can be prevented from entering into the pores by making the surface of adsorption material weak hydrophobicity. However, since the pores are extremely fine, the object can be achieved by weak hydrophobicity. Conversely, since condensed water with strong hydrophobicity avoids the sorption material surface and the water drop diameter is enlarged, it is not desirable. In the inventor's proposal, a laminated honeycomb in a shape formed by applying a corrugating processing to a sheet which supports carbon dioxide sorption material particles to wrap around or a laminated honeycomb which has a laminated form is used. The reason is described below.

As to a layer (floor) which is stuffed by particle-like adsorption material as disclosed in the Patent Documents 7 and 8, at least 12 points of contact of particles exist in one particle, a capillary tube is formed at the point of contact, condensed water is drawn near in the point of contact by capillary tube power as shown in FIG. 9, roughness and fineness of the condensed water are formed on a surface of the particle according to the closest packing theory of a ball, and it has a bad influence on a simultaneous progression of phenomena of carbon dioxide adsorption in an adsorption process and an evaporation-cooling phenomenon. That is, evaporative cooling water breaks off on the way in a coarse portion of the condensed water. On the other hand, a start of adsorption is overdue with a water film covered thickly in the surface in a dense portion of condensed water on a contact part of the particles.

A diameter of optimal particles is determined by a relationship during a capacity of the particles, an amount of condensation and evaporation of water, and surface area of the particles. That is, there is a desorption process of carbon dioxide gas by condensation of vapor in the sorption material surface, and an effective diameter of the particle exists in a sorption process in a principle of a carbon dioxide sorption concentration device which removes sorption heat of carbon dioxide by evaporation latent heat of water adhering to the sorption material surface.

The content of the water of a desirable layer (floor) is specified in Patent Document 7. That is, the water which covers the surface so much exceeding the hydrous possible quantity of ion-exchange resin interrupts normal gas passage, as shown in FIG. 9. Since water is blown away by the gas stream at the lower stream side, it is difficult to control the content of water in the amount of assumption. Therefore, the flow velocity of gas is restricted. Having also considered pressure loss, as for the face velocity of the adsorption layer, 1 or less m/s could not but become a practical use range. For example, if it becomes a particle of 2 mm or more, the water film condensed on particles from the relation of the amount of adsorption as shown in FIG. 11 will also become thick. Therefore, there is a demerit that water flows down with gravity or the maldistribution of flocculated water arises according to the capillary tube power formed among particles etc.

The relation of the diameter of a particle, surface area, volume, and specific surface area is shown in FIG. 2. The relation between the diameter of a particle and the quantity of heat which heats particles to the temperature which carbon dioxide desorbs is shown in FIG. 12. The quantity of heat for desorbing carbon dioxide and the relation of the water film thickness by flocculated water are shown in FIG. 12. This quantity of heat contains latent heat. It turns out that the diameter of a particle, the amount of sorption of carbon dioxide, and the water film thickness condensed to a particle surface are in proportionality relation, and it influences greatly <z and desorption speed, and the evaporation-cooling effect. FIG. 13 shows the graph which calculated the time and thickness change of the water film adhering to a perpendicular hydrophilic side (glass) by flowing down. It turns out that water film thickness maintainable in the operate time of the part unit which the proposed device assumes from this figure is about 10 micrometers. That is, when CO2 sorption material particles of a diameter of a particle which a water film of 10 micrometers or more produces are used, since the water film of the flocculated water which arose at the desorption process flows down from a particle surface and produces the maldistribution of flocculated water before using it for evaporation cooling at a sorption process, it is not desirable. If it takes into consideration maintaining a water film in minutes as shown also in FIG. 12, as for the diameter of a particle, 1 mm or less is desirable, and its 0.6 mm or less is more desirable.

It is difficult for there to be a flow of high pressure loss and the particles by a gas stream and a problem of wear by a fixed floor and a moving bed method as shown in Patent Documents 7 and 8 by such a granule child, and to apply to a large-sized device. Then, in order to make the effect of a granule child's with a diameter of a particle of 1 mm or less carbon dioxide sorption material reveal, a granule child of 1 mm or less is further accepted, respectively to both sides of a sheet as the first method as shown in FIG. 10, and distribution adhesion is carried out. It devised making the honeycomb which carried out corrugated processing, and twisted this sheet, or laminated it apply to this principle device. The sheet surface photograph which accepted a granule child of 1 mm or less further, and carried out distribution adhesion is shown in FIG. 14. Each particles and particles hardly contact, but even if in contact, there are few points of contact. The flocculated water which arose at the time of CO2 desorption can stop at a particle surface as it is until it moves to a sorption process and carries out cooling evaporation, and it can demonstrate the evaporation-cooling effect on the surface of the whole particle.

If it becomes a particulate of 0.6 mm or less, among particles, as for strong capillary tube power and the water which permeated among particles by high pressure loss, drainage will become impossible. Then, second another method of using capillary tube power effectively conversely was devised. A porous sheet is coated with the slurry which mixed minute particles and a binder of 0.1 mm or less. This sheet may be made into a thickness of 0.4 mm or less (a sheet surface photograph is shown in FIG. 15). As mentioned above, between the minute particles which became two or more-fold within the coating layer is filled by the capillary tube power of flocculated water. Since a sheet is honeycomb-shaped, there is no influence in aeration. As shown in FIG. 10, sorption of carbon dioxide gas and the evaporation cooling of water go to the inside of a sheet from the large honeycomb surface. Therefore, the demerit which becomes a problem in the layer (floor) filled up with the adsorption material of particle diameter of 2 mm or more is canceled. Sorption speed, the difference of capacity, the amount of flocculated water, and the evaporative cooling effect have unevenness by the back and front of a sheet. However, the thickness of the sheet which constitutes a honeycomb is 0.4 mm or less, and since the sheet is thin, and the mass transfer of the flocculated water in the table and the reverse side of a sheet and heat movement are good, unevenness is eased. Therefore, performance improvement can be carried out.

When using a particulate of 0.1 mm or less as the second method, after embedding on paper at particles or coating porous paper, corrugated processing can be carried out and it can be processed into a lamination honeycomb. How to carry out an immersion coat to the slurry which prepared sorption material particles and a binder to the lamination honeycomb manufactured in porous paper was shown. The first method of making it carry out distribution adhesion of the particle of 1 mm or less on a sheet to increase sorption material content per honeycomb volume is an effective method for increasing sorption capacity. However, any method of the effect of demonstrating the evaporative cooling effect effectively at a sorption process, and improving sorption performance rather than the method of using the restoration layer (floor) of a particle of 1 mm or more and a moving bed (layer) is the same. And there is little pressure loss harder (which is a honeycomb rotor type), and it does not produce a flow of sorption material particles, and wear. And even when it is large-sized, it has the feature that it is possible to make a lightweight device.

As a basic preferred embodiment, a rotor in a shape of either a disk or a hollow cylinder is applicable, and its structure of the rotor and a change control of the rotor are simple or easy in order that a sorption honeycomb can move to a next process by rotation of the rotor. Therefore, there is a merit of enlarging easily. If a preferred embodiment is described, a rotor which has granular adsorption material in an inner surface of a flute of the honeycomb formed by an inorganic fiber sheet, a metal sheet or a plastic sheet. The granular adsorption material carries granular ion-exchange resin which has an amine group, an amine system carbon dioxide sorption agent, an ionic liquid, etc. As shown in FIG. 4, the rotor is structured so that a sorption zone 13 which introduces material gas shifts through carbon dioxide desorption zone 14 using low-pressure vapor near the atmospheric pressure to return to the sorption zone 13 along with a rotating direction of the rotor again.

The carbon dioxide gas is made sorbed by introducing material gas into sorption zone 13, and then, a honeycomb moves to a desorption zone by rotating the rotor so that the low-pressure vapor is introduced to heat for making carbon dioxide desorbed. Desorption of carbon dioxide and condensation of vapor advance simultaneously. Subsequently, the honeycomb rotates from the desorption zone 14 to a sorption zone, material gas flows again and sorption of carbon dioxide starts in the sorption zone 13.

Since this design is a rotated type, it can also provide a purge zone by a water flow screen at a boundary before and after a sorption zone and a desorption zone as shown FIG. 6, and it can prevent from mixing and outflow of material gas and recovery carbon dioxide gas.

When passing the material gas containing carbon dioxide in a sorption zone and making carbon dioxide sorb a honeycomb, if sorption material and material gas carry out a rise in heat with sorption heat, as shown in FIG. 3, the amount of sorption will decrease. With the proposed device, the sorption heat which arises by sorption of carbon dioxide is removed by the evaporation cooling of the water on the surface of a honeycomb which advances simultaneously. Therefore, the rise in heat of a honeycomb or material gas is controlled, and carbon dioxide gas can be sorbed efficient. The temperature humidity change on the air diagram under carbon dioxide sorption (or adsorption) is shown in FIG. 16. For example, since a rise in heat is carried out from processing gas 0 (zero) to 55° C. of a point (1) with the heat of adsorption of carbon dioxide, etc. in a condensation method with the conventional zeolite rotor, a cooling coil is passed and it cools. That is, the 3 times cooling circulation which progresses to a point (1) from point 0, returns from a point (1) to point 0, progresses to a point (2) from point 0, returns from a point (2) to point 0, and progresses to a point (3) from point 0 is required. Evaporative cooling is carried out to the point shown with a small double circle from the point shown with the small circle of FIG. 16 by the proposed evaporative cooling sorbing method. That is, only by letting gas pass once to a honeycomb, the heat of adsorption equivalent to 3 times circulation processing of the conventional method is changed into latent heat, and is removed. By this, since it stops at the rise in heat up to 45° C., sorption performance improves. There is an effect which improves the endurance of amine system sorption material with low heat resistance.

The honeycomb which sorbs carbon dioxide moves to the desorption zone by rotation of the rotor, low-pressure vapor near the atmospheric pressure is introduced in the desorption zone, and the honeycomb and the sorption material are directly heated by vapor to collect the desorbed carbon dioxide gas.

Since it has an enthalpy of 100 times or more of the 100° C. same atmosphere or carbon dioxide gas, it is not necessary to circulate nearly 100 saturated vapors, re-heating carbon dioxide gas repeatedly, in order to make carbon dioxide gas desorb as shown in FIG. 1. Since vapor including a vast quantity of calorific capacity has few required introduction volume, the desorption zone may be made small and there is no power loss for circulating the desorption gas repeatedly as shown in FIG. 1. The vapor is cooled by heating of the honeycomb and the desorption heat of the carbon dioxide, and the vapor is condensed on the honeycomb and a surface of the sorption material.

The honeycomb and the sorption material immediately after moving to a sorption zone have got wet for the above reason. If material gas flows into the sorption zone, it will be powerfully cooled by the evaporation-cooling phenomenon of water and the sorption of carbon dioxide gas will start. In order to use the evaporation-cooling effect of material gas effectively, it is desirable to carry out cooling dehumidification of the material gas. However, it is not necessary to dehumidify to the minus dew point as the case of using the permutite shown in the Patent Documents 3-5 and the Non-Patent Literature 1, and may be below 10-20° C. D.P. Therefore, the pretreatment system of material gas may be simple and an initial cost and a running cost are also lowered.

In the method of the Patent Documents 3-5 and the Non-Patent Literature 1, since heat of adsorption generates by the adsorption of carbon dioxide, the gas and the honeycomb become high temperature and the amount of adsorption falls. However, according to the proposed method, since the evaporative cooling phenomenon by material gas continues as long as the honeycomb has got wet in water, the sorption heat changes into evaporation heat and is cooled effectively. Therefore, the sorption heat can maintain high adsorption performance. As opposed to the 369.9 kJ/a kg evaporation latent heat incidentally considered to be a standard of the sorption heat of carbon dioxide—573 kJ/kg sublimation latent heat, since the evaporation latent heat of water is 2500 kJ(s)/kg, by evaporation of 1 kg of water adhered or absorbed to a honeycomb and sorption material, it becomes the calculation which can remove the sorption heat of about 4-5 kg of carbon dioxide.

Since the amount of adsorption per one path falls by the rise in heat by heat of adsorption in FIG. 1, it must be made to pass 4 to 7 times while re-cooling the gas to be processed. However, according to the proposed method, since the sorption heat is powerfully cooled by the evaporative cooling phenomenon of water, a great portion of carbon dioxide can be sorbed once with a path, and a volume of a sorption zone will become ¼ or less than the Non-Patent Literature 1. Therefore, it can reduce a diameter of the rotor dramatically. Also, the power cost and initial cost of processing gas circulation blower and reproduction gas circulation blower are also reducible dramatically.

The proposals have an improvement in endurance as an advantage on long-term employment. If some kinds of solid amine system carbon dioxide sorption material and amine system ion-exchange resin do not come in contact with oxygen, they can withstand up to 100° C. of heat. However, in the gas with oxygen, there is an example which deteriorates remarkably even at least 50-60° C. In the proposed method, the temperature of the amine system sorption material at the time of sorption is suppressed to 40° C. or less, and the temperature at the time of desorption becomes 60-100° C. However, since there is almost no oxygen, its degradation is prevented and its endurance improves.

The merit of a case where the purge zone is established by a water screen in the boundary line before and after a sorption zone and a desorption zone as shown in FIG. 6 is explained as follows. In the part which a rotor honeycomb moves to a desorption zone from the sorption zone, if the material gas at the opening of a honeycomb is carried into the desorption zone, the recovery concentration of carbon dioxide will be reduced. Also, in the part which a rotor honeycomb moves to the sorption zone from the desorption zone, the high concentration carbon dioxide gas at an opening of the honeycomb is carried out to the sorption zone outlet side, and reduces recovery rate. Then, since the material gas at the opening of the honeycomb will be exhausted with water into the sorption zone side in the part which a rotor honeycomb moves to the desorption zone from the sorption zone if the purge zone by a water screen is provided as shown in FIG. 6, it can prevent material from gas being carried into the desorption zone and can prevent from reducing the concentration of recovery gas.

Also, in the part which the rotor honeycomb moves to the sorption zone from the desorption zone, since the carbon dioxide gas at the opening of the honeycomb is returned in the desorption zone with purge water, it can prevent an exfiltration of recovery gas. Furthermore, it has the pre-cooling effect of the honeycomb which moves to the sorption zone from the desorption zone. Also, it has a heat collecting effect of preheating water by supplying water to a vapor generating tub after purging.

Since polluted gas such as SOx and nitrogen oxide, etc., which are not able to be removed by a pretreatment exists in material gas, the expensive amine liquid which is deteriorated with the polluted gas in the amine method must be updated per year. In the method, since the desorption carries out by warm water, the polluted gas dissolves in purge water, a contaminant can be removed by changing warm water to energy clean water periodically, and it is effective to reduce the degradation of solid amine system sorption material. As to its maintenance, since it is possible to use energy clean water and pure water as purge water for washing, and also to use the alkaline reproduction liquid dissolved sodium hydroxide, sodium carbonate, etc., there is an effect of the reproduction of the honeycomb rotor and its service life can increase.

BRIEF DESCRIPTION OF THE DRAWINGS

These and/or the other aspects and advantages will become apparent and more readily appreciated from the following description of the embodiments, taken in conjunction with the accompanying drawings of which:

FIG. 6-*b* shows a cross section of the rotor along the A-A in FIG. 6-*a*.

FIG. 6-*c* shows a cross section of the rotor along the B-B in FIG. 6-*a*.

DETAILED DESCRIPTION OF THE PREFERRED EMBODIMENTS

Figure 1:
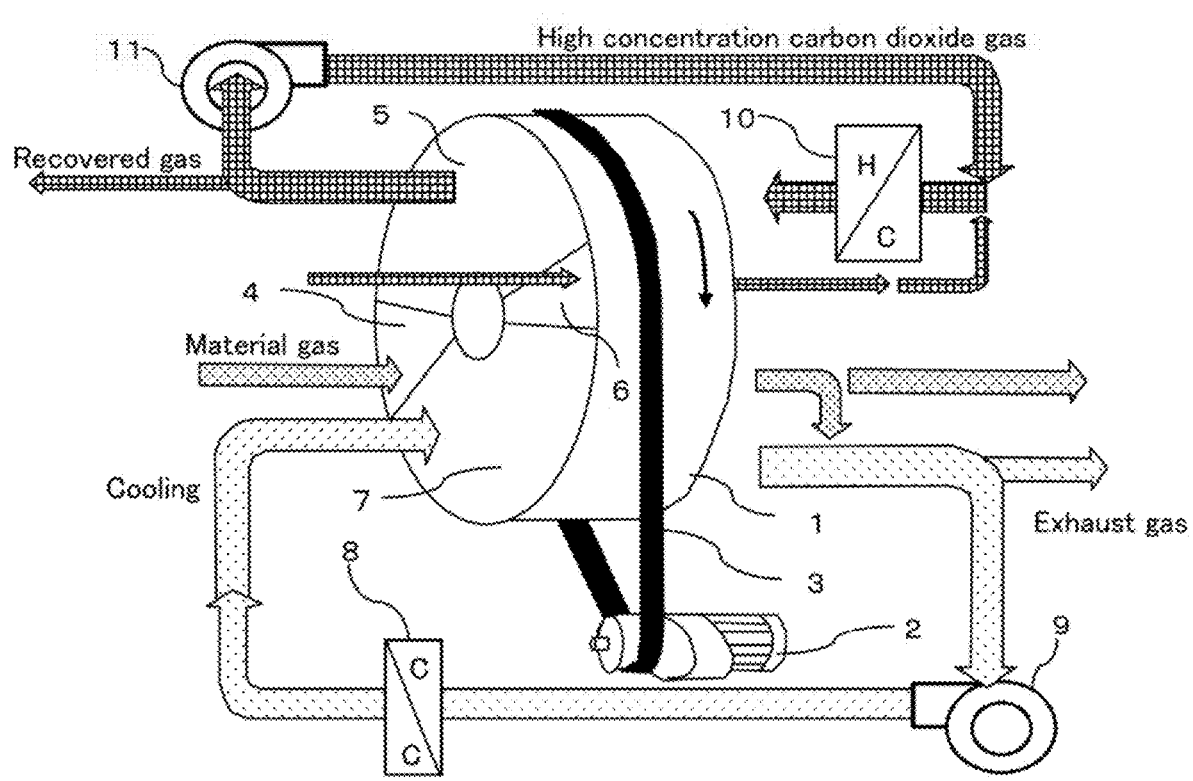
FIG. 1 shows a gas-flow illustration in the conventional example (related art) of the honeycomb rotor type carbon dioxide recovery concentration device in the Non-Patent Literature 1.
Figure 2:
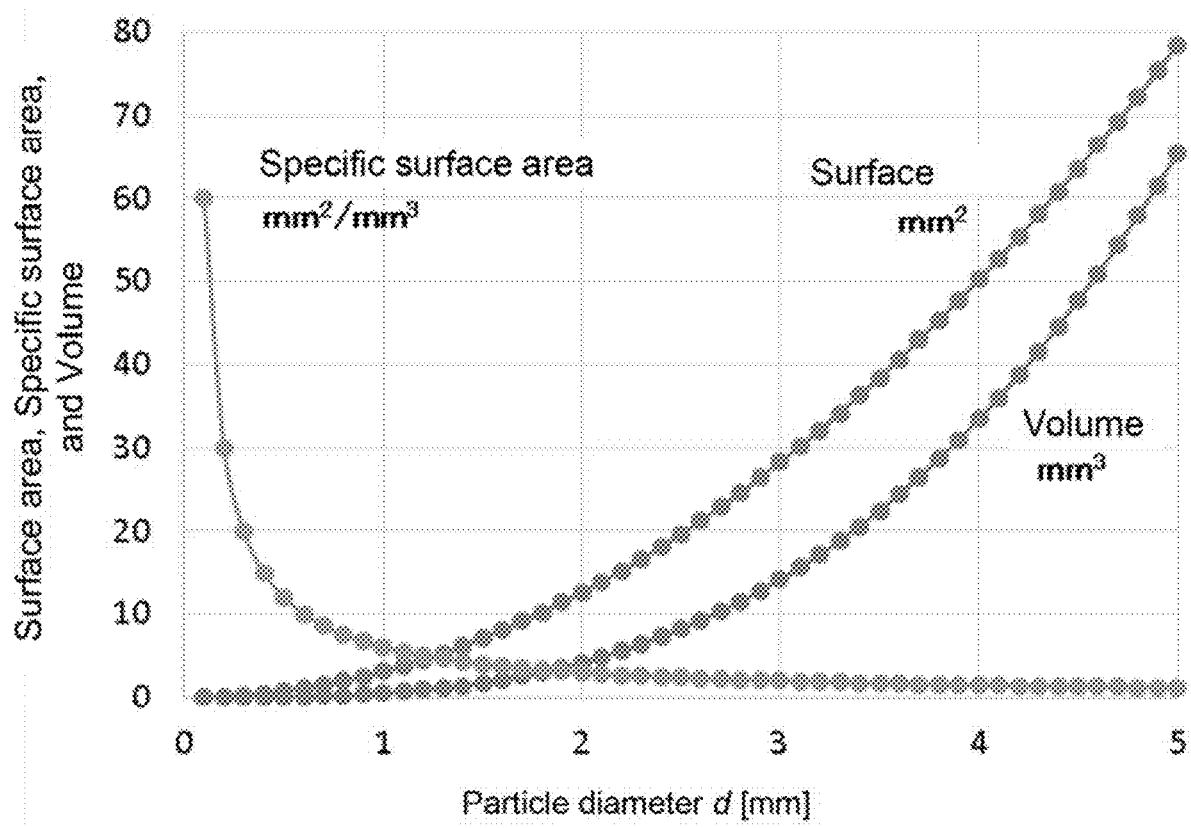
FIG. 2 shows the relationship of the diameter of a particle, surface area, volume and specific surface area.

Reference will now be made in detail to the embodiments, examples of which are illustrated in the accompanying drawings, wherein like reference numerals refer to the like elements throughout. The embodiments are described below to explain the present invention by referring to the figures.

The proposed device is explained where a honeycomb rotor is applied. The honeycomb made from the inorganic fiber sheet, the metal sheet, or the plastic sheet is used for the device. This honeycomb has non-water solubility solid amine particles, such as ion-exchange resin which has an amine machine. This device has a sorption zone and a carbon dioxide desorption zone by low-pressure vapor near the atmospheric pressure along the hand of cut of a rotor.

Since flue gas is at high temperature and at high pressure, and includes polluted gas such as SOx, nitrogen oxide, particulates, etc., the device provides a pretreatment system which is indicated in the Patent Document 4, such as NOx removal equipment, wet scrubber, a desulfurization facility, and a bug filter for removing harmful gas and particulates.

The material gas containing carbon dioxide is passed in a sorption zone, and the carbon dioxide is made to be sorbed by a honeycomb. The honeycomb which sorbed the carbon dioxide moves to a desorption zone by rotating of the rotor, vapor is introduced, the honeycomb is directly heated with the vapor, and the vapor collects the carbon dioxide gas condensed and desorbed on a surface of the honeycomb. Next, the honeycomb rotates to move from the desorption zone to the sorption zone again, material gas flows into a flow pass of the honeycomb again, and sorption of carbon dioxide gas starts in the sorption zone.

In an adsorption method, there is a disadvantage that, for example, all of permutite, activated carbon, etc., which are excellent in carbon dioxide adsorbent adsorb the vapor preferentially in gas to be processed to reduce the adsorption rate of carbon dioxide, and that many energies are necessary in the reproduction desorption side of the device in order to desorb the adsorbed vapor. Also, it is necessary to provide a dedicated process for exclusive use for desorbing periodically the vapor which has been carried out by adsorption and accumulation.

On the other hand, in the proposed method, immediately after sorption material changed from desorption to sorption, the sorption material has got wet with flocculated water and the moisture evaporates by passage of material gas to be processed. The evaporation have such effects that thermal storage of the honeycomb is cooled immediately after desorption and that the sorption heat of carbon dioxide is cooled. Therefore, the action of the water in this system has not a minus effect but the feature that it can change to a plus effect rather.

In a case where the honeycomb rotor which supports zeolite system adsorption material for carbon dioxide concentration is used, since zeolite adsorbs vapor preferentially rather than carbon dioxide and carbon dioxide adsorption capability declines, it is necessary to dehumidify material gas about dew point temperature-20-60° C. in the pretreatment by the honeycomb rotor dehumidifier to introduce into as indicated in the Patent Document 4. However, there is no necessity for this according to the inventor's proposals. Although it is better to carry out cooling dehumidification to some extent in order to use the evaporative cooling effect as explained above in a sorption zone, it is not necessary to lower to minus dew point temperature.

Figure 3:
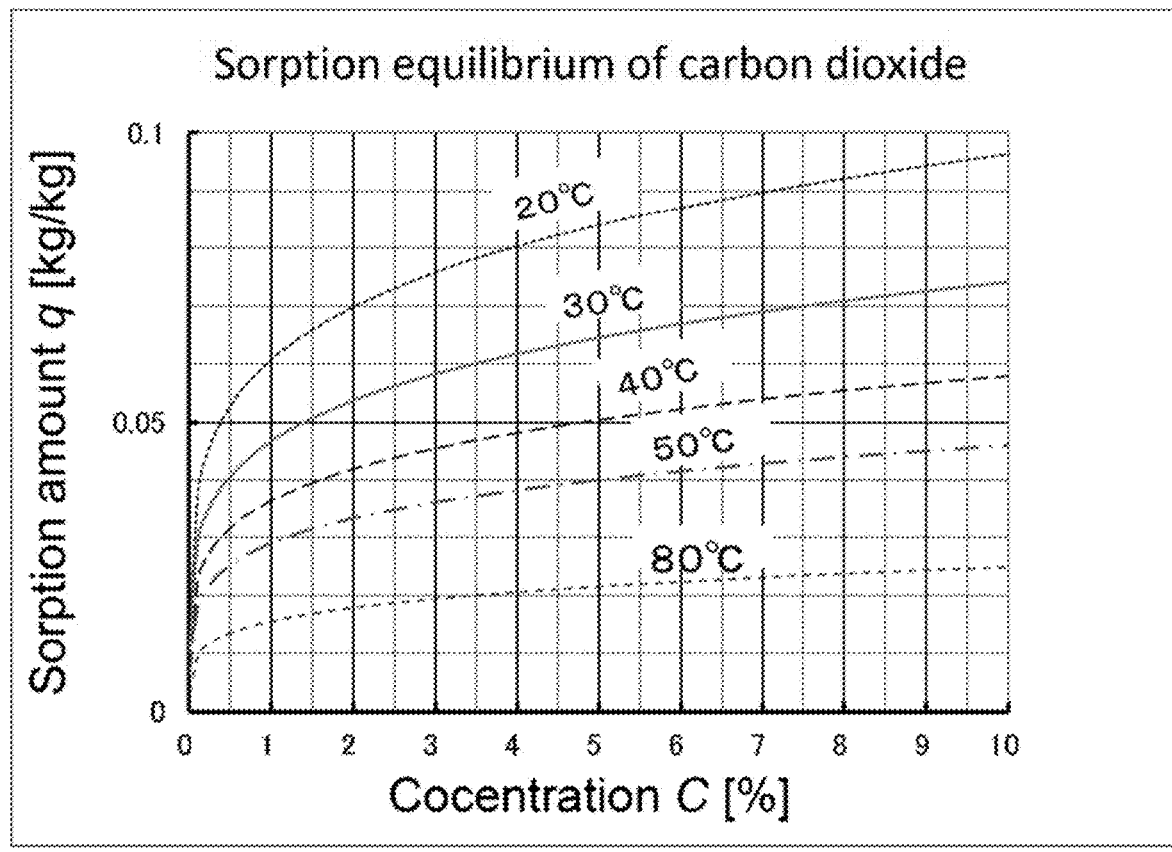
FIG. 3 shows a graph of a carbon dioxide adsorption equilibrium of solid amine system sorption material.

For carrying out cooling dehumidification of the gas to be processed, a cold heating device is required, and then energy expenditure increases. However, if temperature of the sorption gas is made to be low, the adsorption capacity of solid amine increases drastically as shown in FIG. 3. Although it is actually next to impossible to improve the amount of adsorption of adsorption material twice, it is lowering gas temperature and suppressing the rise in heat under adsorption by the evaporative cooling effect, and it is possible to double substantial adsorption capacity. As explained above, cooling the material gas makes the carbon dioxide recovery concentration device to have high efficiency, to be compact, and it can miniaturize and can attain miniaturization of all the systems, and energy saving as a result.

Energy saving is aimed at plants or a garbage incineration place so that collection and reuse of waste heat is carried out as much as possible. However, as for low-temperature exhaust heat of warm water. etc., its usage is restricted. The method of doubling system-wide capability using this low-temperature exhaust heat has a superiority also in respect of synthetic energy saving. Excessive low-temperature exhaust heat may be used for cooling dehumidification of processing air by an absorption refrigerating machine and an adsorption type freezer. These freezers can reduce the cost of recovery and concentration of carbon dioxide by utilizing the low-temperature exhaust heat which cannot be used for desorption in an amine type and a TSA method as shown in the Patent Documents 3-5 and Non-Patent Literature 1.

If it combines with a heat pump such as a $CO_2$ heat pump which can perform hot heat recollection while cooling, it will also become possible to reduce a running cost sharply by using the collected heat as the heat source for vapor generation while cooling the gas to be processed.

Figure 4:
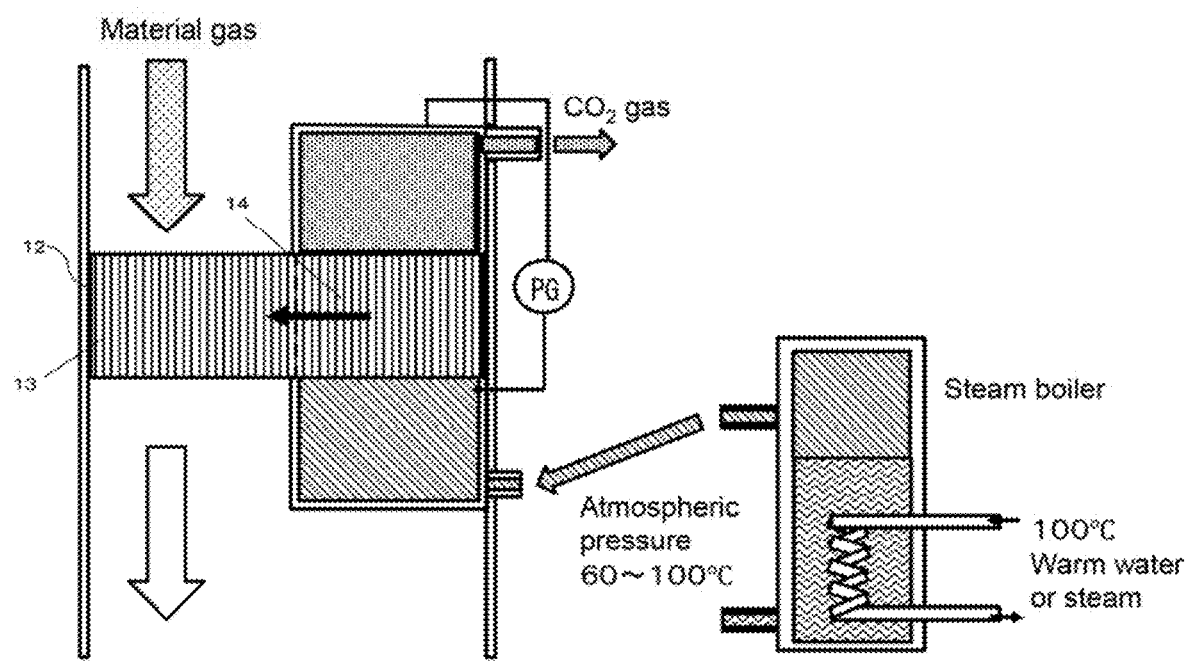
FIG. 4 shows a gas-flow illustration (schematic structure) of a first preferred embodiment of the proposed carbon dioxide recovery concentration device.

The preferred embodiment 1 of the proposal is described along with FIG. 4 as follows. A honeycomb rotor 12 is formed so that particulates of solid amine and binder of heat-resistant water resistance are mixed to provide coat liquid, the coat liquid is coated on porous paper to provide a coated sheet, the coated sheet which is made dry and a corrugated processing carries out on the coated sheet to provide a corrugated sheet, the corrugated sheet is made to be rolled to form a rotor. The porous paper includes plastic textiles such as inorganic-fiber based PET-fiber such as glass fiber. In the proposal, fireproofing for honeycomb rotor 12 is unnecessary by using vapor for desorption of the sorbed carbon dioxide, and it is desirable to use as a support member a base material paper which is mixed with inorganic fibers such as glass fiber and synthetic fibers such PET in order to preserve its shape and intensity in an inside of warm water. However, if it is a nonwoven fabric. etc., of the synthetic fiber which has vapor-proof nature, firmness and intensity, the intervention of an inorganic fiber is not indispensable.

The carbon dioxide recovery concentration device on which the rotor 12 is mounted provides a sorption zone 13 and a desorption zone 14, and the honeycomb rotor 12 structures a sorption zone 13 so that it may return to the sorption zone 13 through the desorption zone 14.

The exhaust gas which is discharged from a plant etc., is processed by denitrogenization, desulfurization and dust removal to make material gas. The material gas is introduced into the sorption zone 13 so that the carbon dioxide is sorbed by the granular solid amine supported by the honeycomb.

When carbon dioxide is sorbed, sorption heat generates and carbon dioxide sorption capability is reduced by rise of gas temperature. However, since the honeycomb of the sorption process of rotor 12 of the proposal is moist with the flocculated water in a desorption process, water evaporates by passage of material gas, an evaporative cooling phenomenon is produced and a rise in heat is suppressed, therefore, sorption performance improves dramatically.

The evaporation latent heat of water which is 2500 kJ/kg-K is 6 times or more than the evaporation latent heat of carbon dioxide which is 369.9 kJ/kg-K. The over 6 time latent heat can change the sorption heat to the evaporation latent heat of water to remove it effectively. Then, in the technology described in FIG. 1 of the Non-Patent Literature 1, if the material gas cannot circulate in the processing zone 4 and the cooling zone 7 while cooling over and over again, the recovery rate of carbon dioxide is not improved. However, in the proposal, the recovery rate can be attained sufficient by one passage. Therefore, the miniaturization of a device and power reduction of blower, i.e., energy-saving nature can be attained simultaneously.

The honeycomb moves to the desorption zone 14 by rotation of a rotor after sorbing carbon dioxide, and the low-pressure vapor near the atmospheric pressure is introduced in the honeycomb from a steam boiler in desorption zone 14. The low-pressure vapor near the atmospheric pressure which are about 100-2000-Pa positive pressure vapor from atmospheric pressure adjusts the pressure of low-pressure vapor by controlling a steam boiler by the value of two pressure gauges (PG) installed in the desorption zone. The honeycomb is heated by the vapor and the vapor is simultaneously condensed to an inner surface of the honeycomb. The carbon dioxide gas by which solid amine of the honeycomb has sorbed is desorbed and collected, and the honeycomb which has finished with the desorption is returned to the sorption zone 13 again, and thereby, recovery and concentration of carbon dioxide gas can be carried out continuously.

Figure 5:
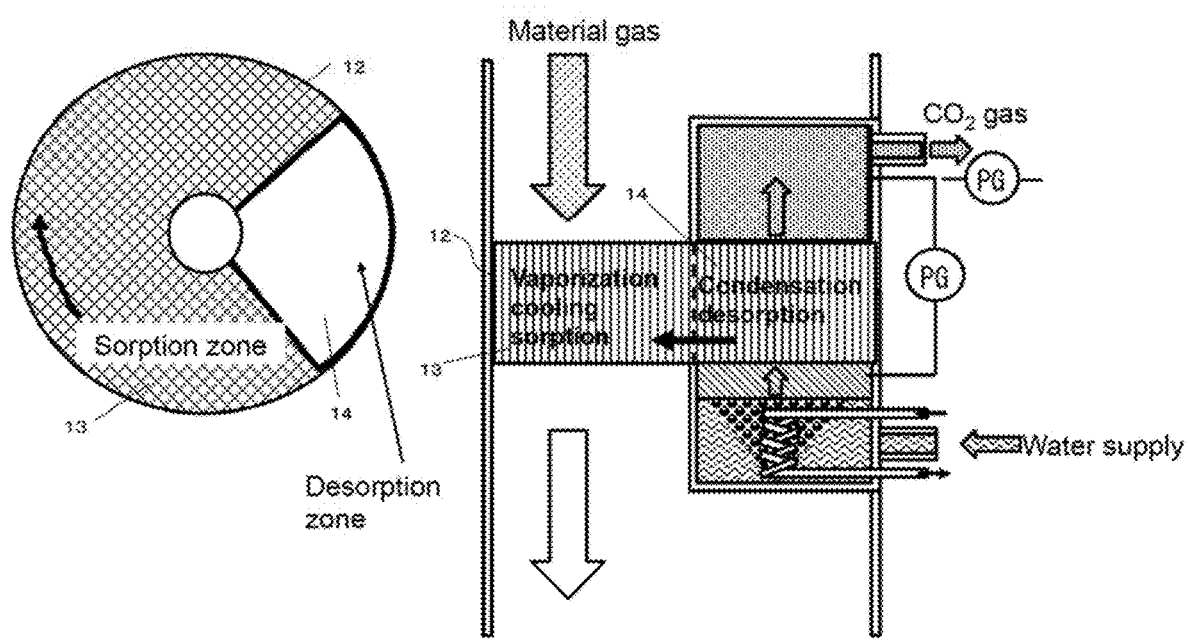
FIG. 5 shows a gas-flow illustration (schematic structure) of a second preferred embodiment of the proposed carbon dioxide recovery concentration device.

The preferred embodiment 2 of the proposal is described along with FIG. 5. The carbon dioxide concentration honeycomb rotor 12 is formed so that both sides of the sheet material such as metallic foil or a plastic sheet are coated by heat-resistant and waterproof adhesives, the sheet is carried out by distribution adhesion with the 0.3-1-mm granular ion-exchange resin particle, the sheet is carried out by procession of corrugation, and further the sheet is made to be twisted around the back and front or the sheets are laminated.

Although the sheet which has been carried out by distribution adhesion of the ion-exchange resin particles can be manufactured, for example, by such method as Japanese Patent Publication H7-16576, the sheet is not limited to this method.

The carbon dioxide recovery concentration device starts moving from the sorption zone 13 to the desorption zone 14 in a rotating direction of the rotor, and returns to the sorption zone 13. If the material gas containing the carbon dioxide gas is introduced into the sorption zone 13, an ion-exchange resin particle layer which has been carried out by distribution adhesion on the honeycomb sorbs the carbon dioxide. The above material gas is made by pretreatments of cooling and dehumidification of the exhaust gas discharged from plants, etc.

Sorption heat generates when carbon dioxide is sorbed. However, since the carbon dioxide sorption honeycomb of the rotor 12 of the proposal is moist with water by the same reason as the preferred embodiment 1 describes, a rise in heat is suppressed and sorption performance improves by an evaporative cooling phenomenon of water evaporated by passage of material gas.

The evaporation latent heat of water which is 2500 kJ/kg-K is 6 times or more than the evaporation latent heat of carbon dioxide which is 369.9 kJ/kg-K. The over 6 time latent heat can change the sorption heat to the evaporation latent heat of water to remove it effectively. Then, in the technology described in FIG. 1 of the Non-Patent Literature 1, if the material gas cannot circulate in the processing zone while cooling over and over again, the recovery rate of carbon dioxide is not improved. However, in the proposal, the recovery rate can be attained sufficient by one or two circulation. Therefore, the miniaturization of a device and power reduction of blower, i.e., energy-saving nature can be attained simultaneously.

A lower part of the desorption zone provides with a vapor generating water tank, the water is heated by the heater which is provided in the tank to generate vapor, and the vapor is introduced into a desorption zone. Since it is not necessary to form a steam boiler outside, the desorption zone has simple structure and it can miniaturize and can make low-cost.

Similarly to the preferred embodiment 1, in a desorption zone 14, the vapor is introduced into the honeycomb and is heated, and also, the carbon dioxide gas which has been sorbed by the ion-exchange resin of the honeycomb is disorbed and collected. The honeycomb where the desorption has been finished moves to the sorption zone 13 again, and thus, the honeycomb can carry out the recovery and the concentration of carbon dioxide gas continuously.

Figure 6A:
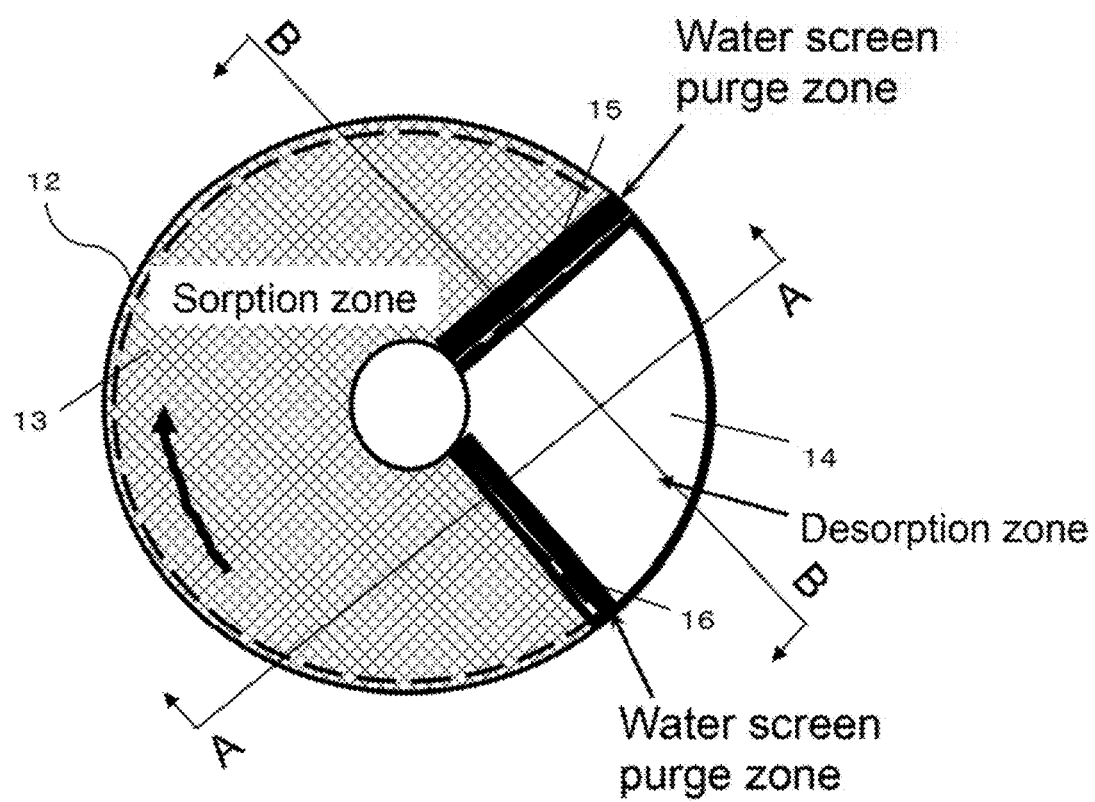
FIG. 6-*a* shows divided zones of the rotor of a third preferred embodiment 3 of the proposed carbon dioxide recovery concentration device.
Figure 6B:
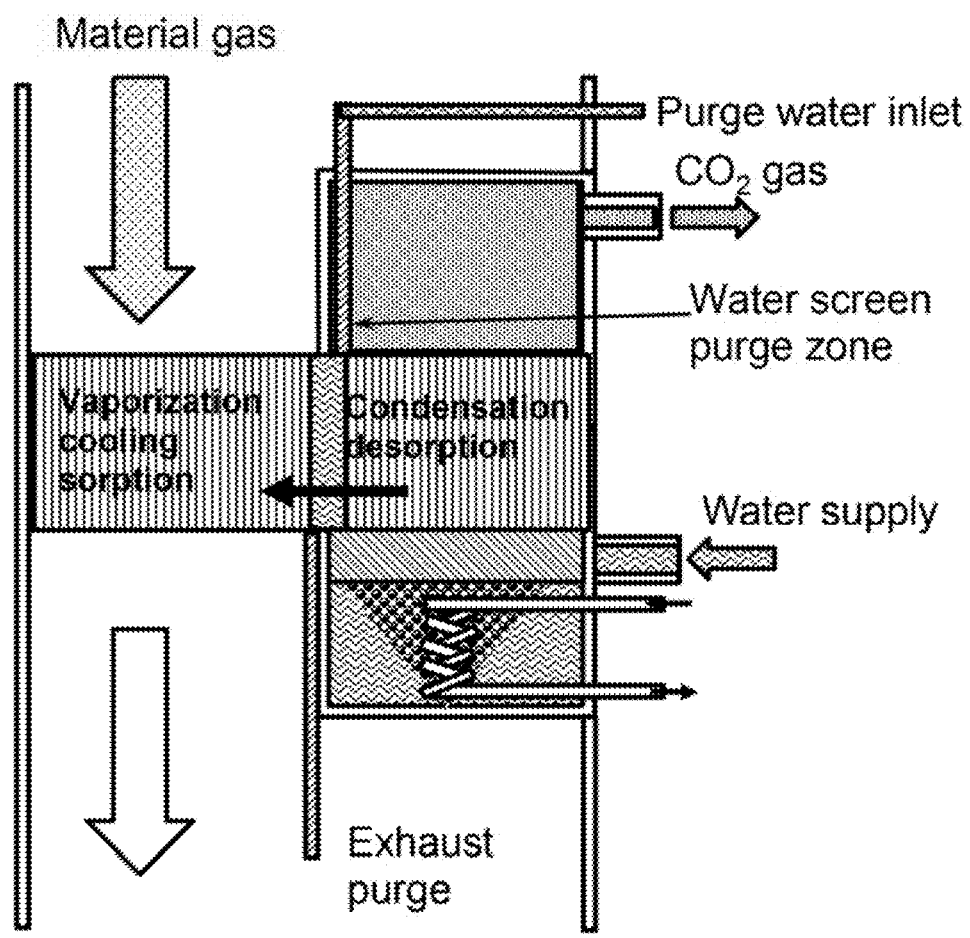
Figure 6C:
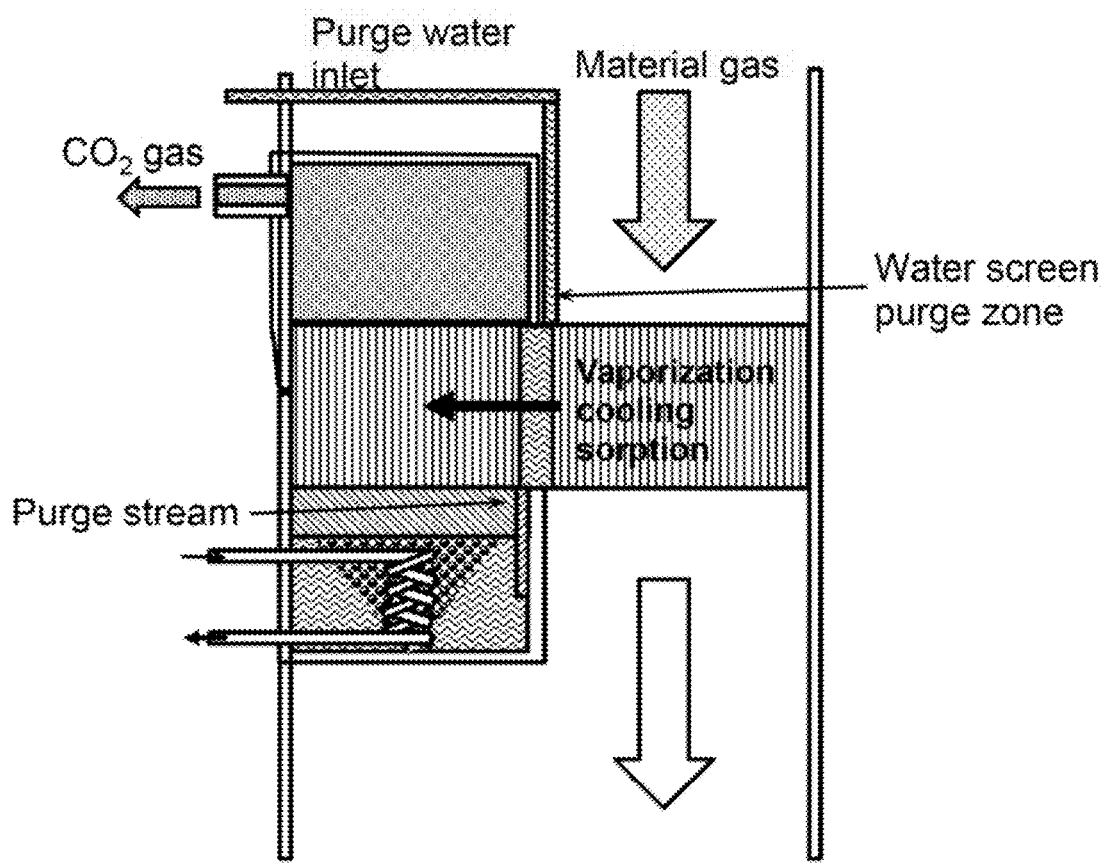

In FIGS. 6-*a*, *b*, and *c*, the preferred embodiment 3 in a case where a water screen purge zone is provided is shown. FIG. 6-*b* is a section view along with A-A of FIG. 6-*a*, and FIG. 6-*c* is a section view along with B-B of FIG. 6-*a*. The merit in a case where water screen purge zones 15 and 16 is provided in a boundary line before and after the sorption zone and the desorption zone shown in FIG. 6-*a, b*, and *c* is explained as follows. In a position where the rotor honeycomb moves from the sorption zone to the desorption zone, the material gas in an opening of the honeycomb is carried into the desorption zone, and it reduces the recovery and the concentration of the carbon dioxide. In a position where the rotor honeycomb moves from the desorption zone to the sorption zone, the high concentration carbon dioxide gas in the opening of the honeycomb is carried out to the sorption zone side, and it reduces a recovery rate.

Then, if the water screen purge zones 15 and 16 are provided as shown in FIG. 6, at the position where the rotor honeycomb moves to the desorption zone from the sorption zone, since it can prevent that the material gas of the opening of the honeycomb is exhausted with water at the sorption zone side and is carried into a desorption zone, it reduces the concentration of recovery gas. Also, in the position where the rotor honeycomb moves to the sorption zone from the desorption zone, the carbon dioxide gas in the opening of the honeycomb is returned to the desorption zone side with water, and can prevent from exfiltration of the recovery gas. Furthermore, it has the pre-cooling effect by the honeycomb which moves to the sorption zone from the desorption zone and the heat recollection effect of preheating supplied water by supplying the purge water to a vapor generating tub.

Figure 7:
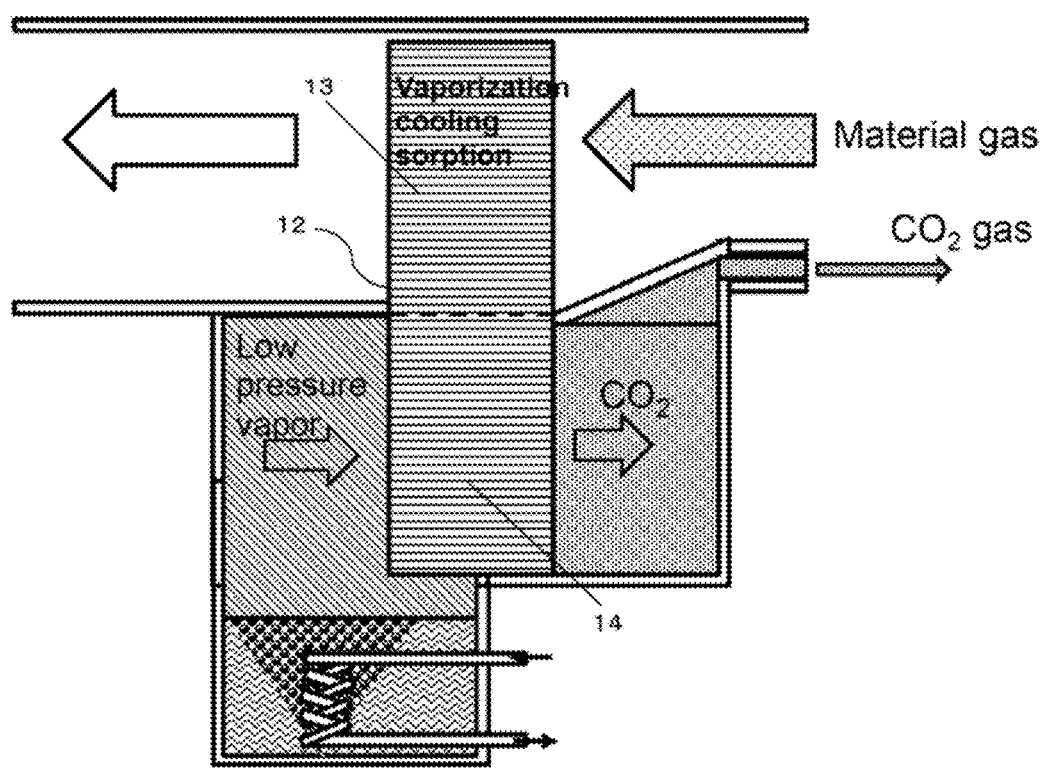
FIG. 7 shows a gas-flow illustration of a fourth preferred embodiment of the proposed carbon dioxide recovery concentration device.

The preferred embodiment 4 on the proposal is described along with FIG. 7. The preferred embodiments 1-3 show the example of structure of that a honeycomb rotor rotates horizontally. On the other hand, the preferred embodiment 5 shows the example of structure of that a honeycomb rotor rotates in a lengthwise direction. Since a honeycomb rotor is also used in this embodiment, a water screen purge is possible, the water introduced in the honeycomb functions by being pushed out by total pressure of material gas at the lower stream side. The pushed-out water is collected and is again used as water supply of a water screen, or is reused as water supply to a vapor generating tub.

As to the honeycomb rotor which rotates in the lengthwise direction, the water between the sorption material particles of the lower surface in the honeycomb tends to be drained by gravity and the water between the sorption material particles on the upper surface in the honeycomb is hard to be drained. However, since the honeycomb sheet is thin, its heat conduction is good, and this demerit is canceled by the heat conduction of on the lower and upper surfaces. That is, on the lower surface where a water film is thin, sorption starts early and sorption heat generates, even if the amount of water runs short in a second half of the sorption process, the sorption heat is removed by evaporative cooling of the water in the upper surface of the sheet. Conversely, on the thick upper surface of a water film, even if sorption is overdue, evaporation of the water on the upper surface of the rotor is promoted by sorption heat on the lower surface of the sheet, and the bad influence by the distribution difference of water has an effect eased as a result. As to the carbon dioxide recovery concentration device utilizing the principle which removes sorption heat by the evaporative cooling effect of the water condensed at the time of desorption by vapor in the time of sorption of carbon dioxide gas, the merit that the sorption layer (floor) is honeycomb-shaped is specific as explained above.

Figure 8:
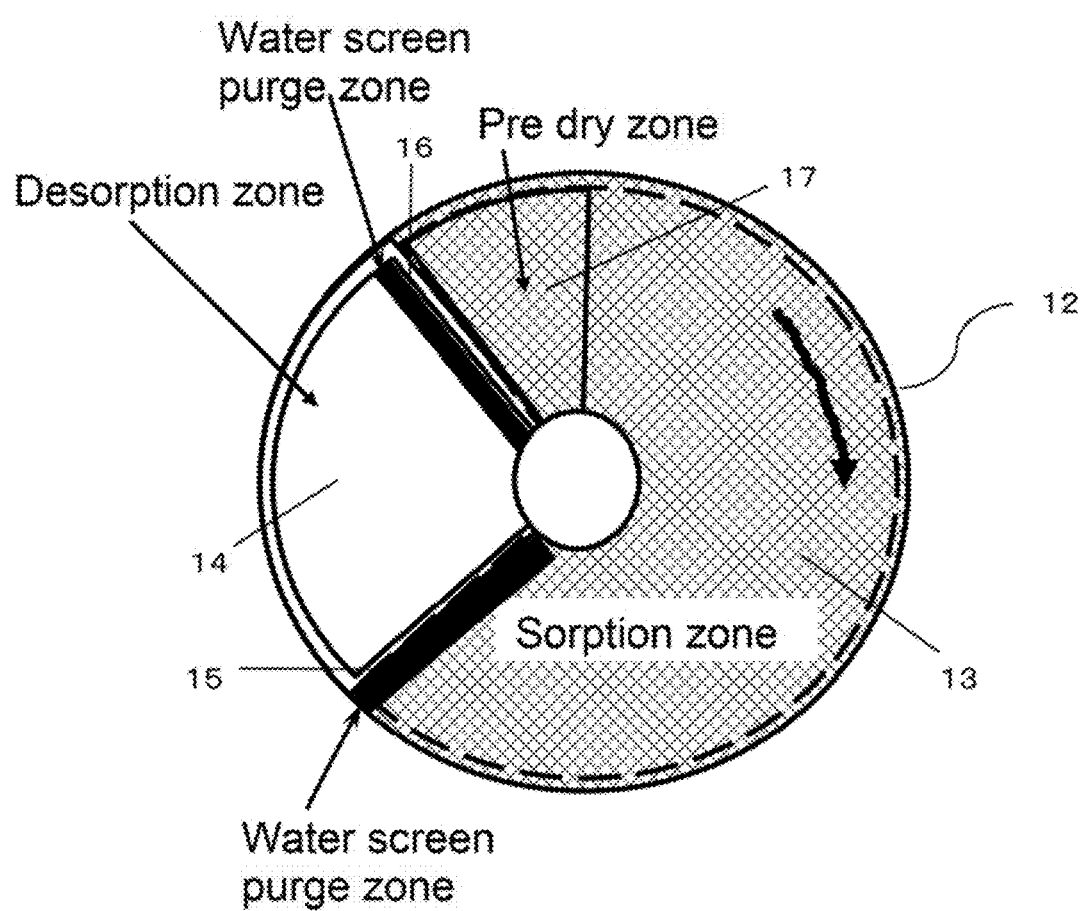
FIG. 8 shows divided zones of a fifth preferred embodiment of the proposed carbon dioxide recovery concentration device.
Figure 9:
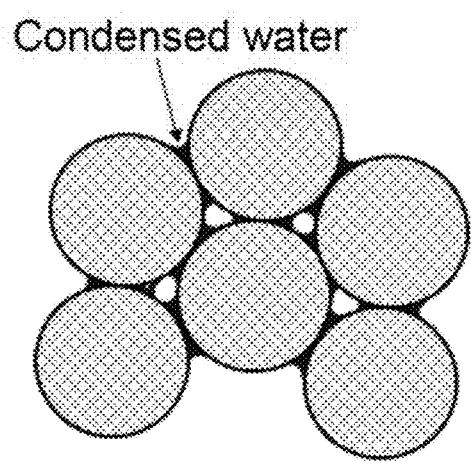
FIG. 9 shows the condensed water which is condensed at the contact points of granular adsorption material in the conventional example.
Figure 10:
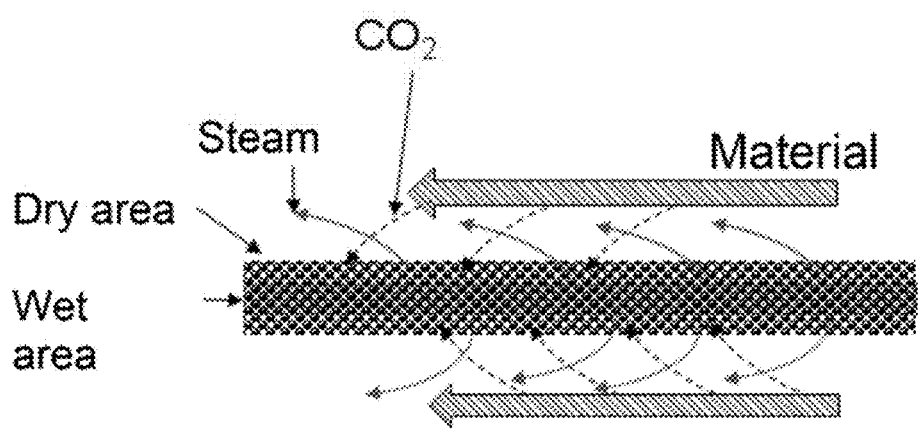
FIG. 10 shows the sheet surface on which the slurry in which micro particles and a binder are mixed is coated.
Figure 11:
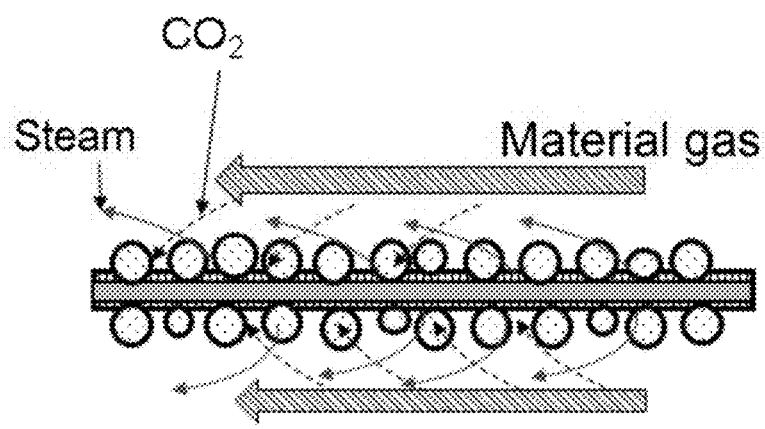
FIG. 11 shows the sheet surface on which the slurry in which small particles of 2 mm or more and a binder are mixed is coated.
Figure 12:
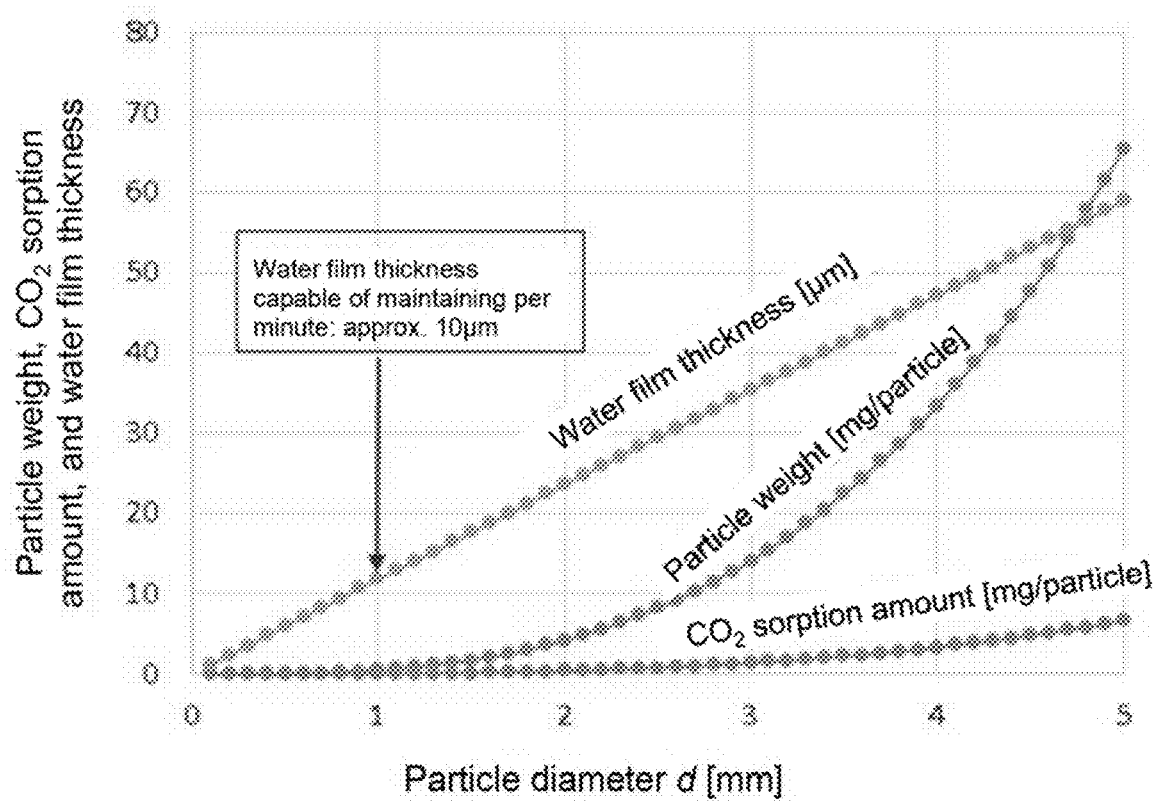
FIG. 12 shows the relationship between the particle diameter and the particle weight, CO2 sorption amount, and water film thickness.
Figure 13:
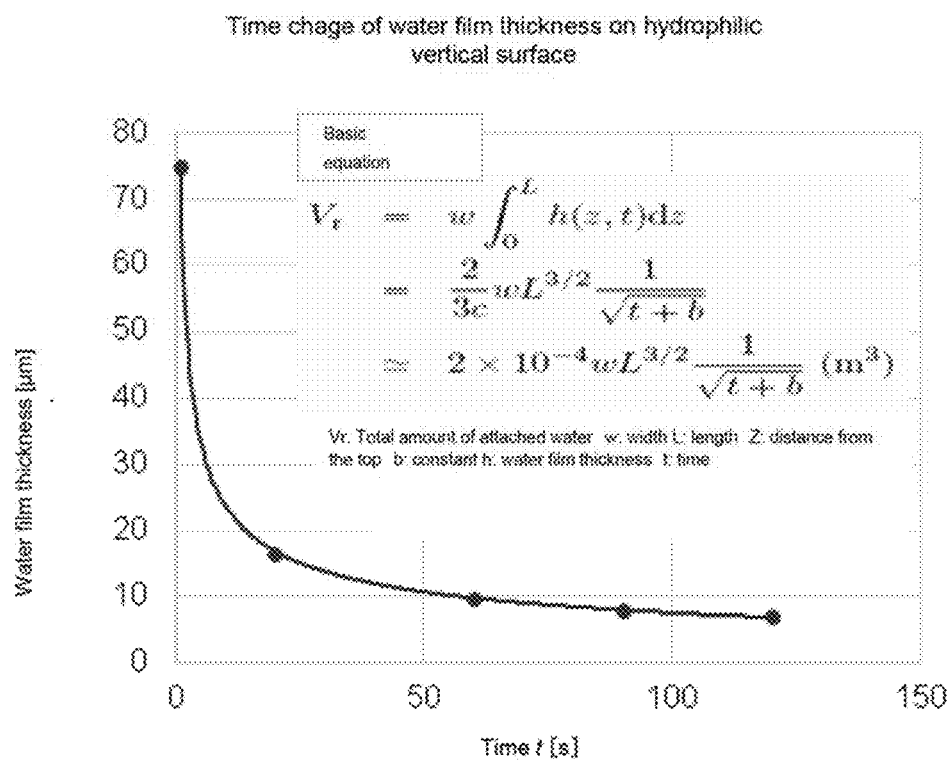
FIG. 13 shows the time charge of water film thickness on hydrophilic vertical surface.
Figure 14:
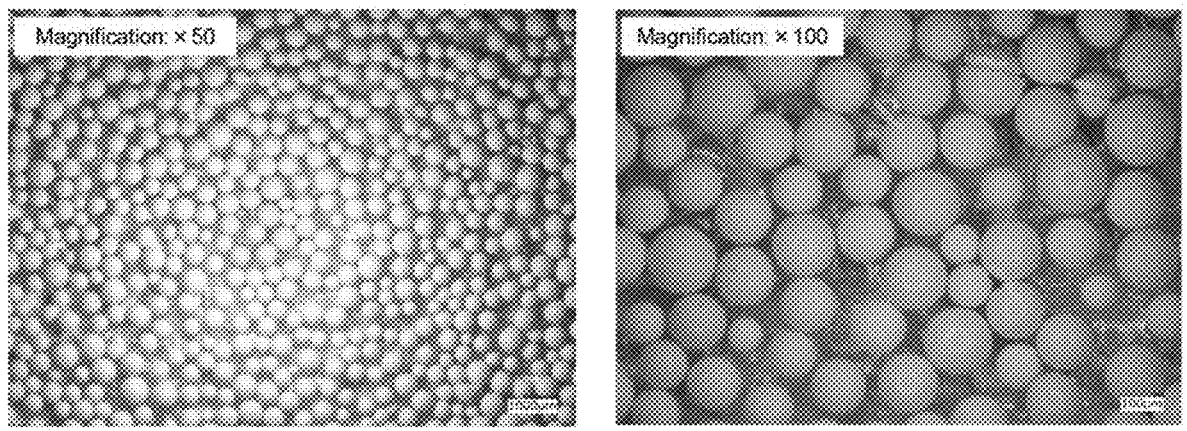
FIG. 14 shows the microphotograph of the surface of the sheet on which the slurry in which small particles of 1 mm or less and a binder are mixed is coated so as to be a single layer.
Figure 15:
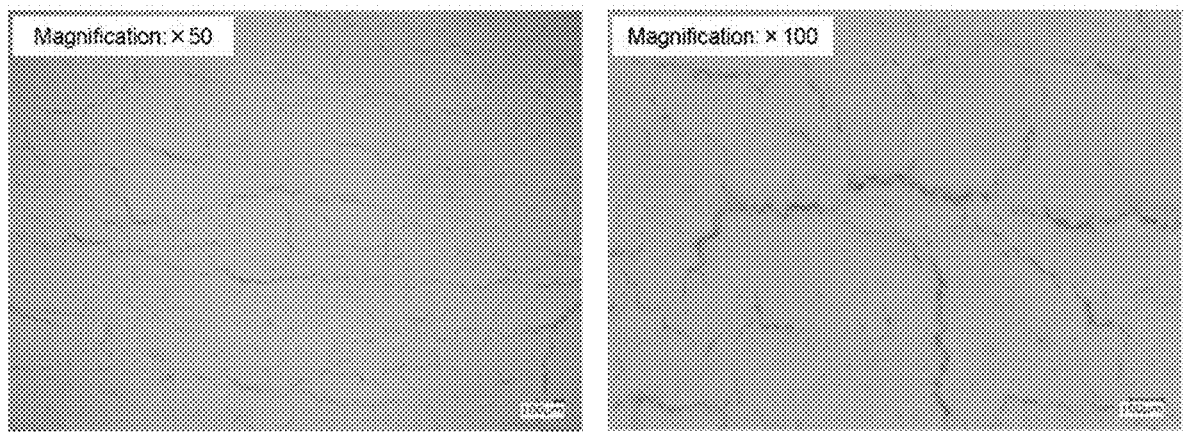
FIG. 15 shows the microphotograph of the surface of the sheet of 0.4 mm or less in which the slurry in which micro particles of 0.1 mm or less and a binder are mixed is coated on the porous glass fibrous sheet.
Figure 16:
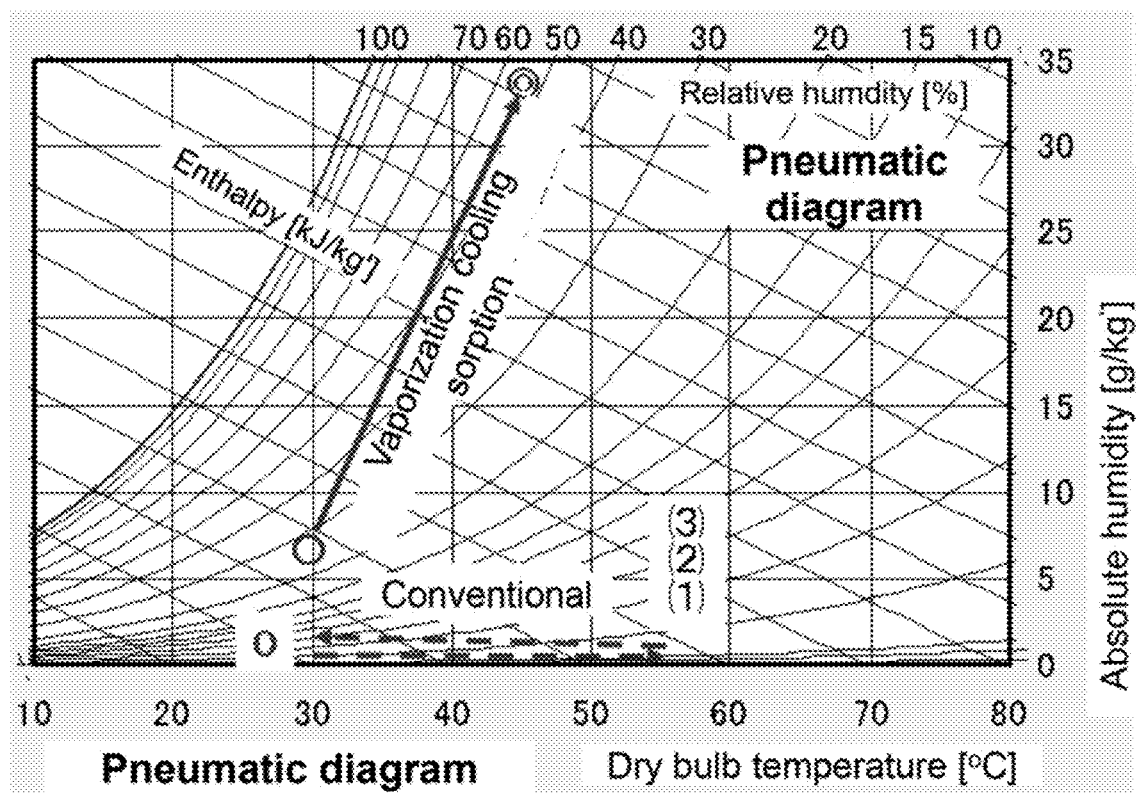
FIG. 16 is a pneumatic diagram showing a temperature/humidity change under carbon dioxide sorption (or adsorption).

The preferred embodiment 5 of the proposal is described along with FIG. 8. The carbon dioxide recovery concentration device moves to a sorption zone 13, a water screen purge zone 15, a desorption zone 14 and a water screen purge zone 16 in a rotating direction of the honeycomb rotor 12 and returns to the sorption zone 13 as same as other embodiments. However, in this embodiment, a pre dry zone 17 is provided between a water screen purge zone 16 and a sorption zone 13. Although the honeycomb which comes out of the water screen purge zone 16 has got wet in water and the water evaporates according to an evaporative cooling phenomenon. However, in the state of the first stage, a water film exists in the surface and fine pores of solid amine, and sorption of carbon dioxide is suppressed by passage of material gas. It constitutes so that a honeycomb may move to the sorption zone 13 after carrying out an air blow until a water film decreases in this initial state in the pre dry zone 17. When material gas is used as pre dry gas, a carbon dioxide recovery rate can be improved by returning outlet gas from the pre dry zone 17 to a previous process. Also, only pre dry zone 17 is possible for using the open air, and pre dry exit air can be discharged in the open air.

Since a recovery concentration and a recovery rate can be improved simultaneously and the carbon dioxide can be effectively condensed with little consumption energy using low-temperature exhaust heat, the carbon dioxide recovery concentration device of the proposal can be applied in a case where concentration removal of the carbon dioxide from exhaust gas from plants, etc., is carried out.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

What is claimed is:

1. A method comprising:
   providing a honeycomb rotor which supports non-water soluble amine ion exchange carbon dioxide sorption particles having a sorption capability for carbon dioxide;
   rotating the honeycomb rotor though at least a sorption zone and a desorption zone which are sealed from each other; and
   performing a recovery concentration method for carbon dioxide while rotating said honeycomb rotor, the recover concentration method comprising:
   making said sorption zone contact with a mixed gas which contains carbon dioxide while said sorption zone is wet, to sorb carbon dioxide from the mixed gas by cooling the mixed gas and vaporizing water in said sorption zone; and
   after rotating the honeycomb rotor, desorbing the carbon dioxide by providing water vapor to the desorption zone and introducing the water vapor into honeycombs of said honeycomb rotor which have sorbed carbon dioxide, to thereby desorb carbon dioxide from the desorption zone in a state of high concentration.

2. A carbon dioxide recovery concentration device comprising:
   a honeycomb rotor which supports non-water soluble amine ion exchange carbon dioxide sorption particles having a sorption capability for carbon dioxide; and
   a rotor rotating device having at least a sorption zone and a desorption zone which are sealed from each other, the honeycomb rotor being rotatably provided in the rotor rotating device, wherein the carbon dioxide recovery concentration device is configured so that:
   recovery concentration of carbon dioxide recovers carbon dioxide by rotating said honeycomb rotor,
   a mixed gas which contains carbon dioxide at a relative humidity of 100% or less is introduced to the sorption zone while the sorption zone is wet, to sorb carbon dioxide from the mixed gas by vaporizing water and cooling the mixed gas in said sorption zone, and carbon dioxide is desorbed in the desorption zone by introducing water vapor into honeycombs of said honeycomb rotor which have sorbed carbon dioxide, to desorb carbon dioxide.

3. A carbon dioxide recovery concentration device according to claim 2, wherein said non-water soluble carbon dioxide sorption particles are formed of an amine system ion-exchange resin.

4. A carbon dioxide recovery concentration device according to claim 2, wherein said non-water soluble carbon dioxide sorption particles are formed of a solid adsorption material which supports an amine.

5. A carbon dioxide recovery concentration device according to claim 2, wherein the non-water soluble carbon dioxide sorption particles have a particle diameter of 1 mm or less.

6. A carbon dioxide recovery concentration device comprising:
a honeycomb rotor which supports non-water soluble carbon dioxide sorption particles having a sorption capability for carbon dioxide; and
a rotor rotating device having at least a sorption zone and a desorption zone which are sealed from each other, the honeycomb rotor being rotatably provided in the rotor rotating device, wherein the carbon dioxide recovery concentration device is configured so that:
recovery concentration of carbon dioxide recovers carbon dioxide by rotating said honeycomb rotor,
a mixed gas which contains carbon dioxide at a relative humidity of 100% or less is introduced to the sorption zone while the sorption zone is wet, to sorb carbon dioxide from the mixed gas by vaporizing water and cooling the mixed gas in said sorption zone, and
carbon dioxide is desorbed in the desorption zone by introducing water vapor into honeycombs of said honeycomb rotor which have sorbed carbon dioxide, to desorb carbon dioxide, wherein
the rotor rotating device has first and second boundaries between the sorption zone and the desorption zone, where the sorption zone and the desorption zone are separated from one another in a rotating direction of the honeycomb rotor,
at least one of the first and second boundaries is provided as a water screen purge zone, and
water is introduced into the honeycomb rotor in each water screen purge zone.

7. A carbon dioxide recovery concentration device according to claim 6, wherein
the first boundary between the sorption zone and the desorption zone is located at an upstream side of the sorption zone in the rotating direction,
a first water screen zone is located at the first boundary between the sorption zone and the desorption zone,
a pre-dry zone is provided between the first water screen purge zone and the sorption zone in the rotating direction such that the honeycomb rotor rotates through the first water screen zone then rotates through the pre-dry zone then rotates through the sorption zone, and
a pre-dry gas is blown through the honeycomb rotor in the pre-dry zone.

8. A carbon dioxide recovery concentration device according to claim 6, wherein
excess water drains from the honeycomb rotor at an outlet of at least one water screen purge zone,
the excess water from the at least one water screen purge zone is collected and recycled,
a vapor generating tub generates water vapor for introduction into the desorption zone of the honeycomb rotor, and
the excess water is recycled back to at least one of an inlet of the at least one water screen purge zone and the vapor generating tub.

9. A carbon dioxide recovery concentration device according to claim 2, wherein
said honeycomb rotor comprises a substrate that carries the non-water soluble carbon dioxide sorption particles,
the non-water soluble carbon dioxide sorption particles are solid amine particles, and
the substrate is formed of a porous paper containing plastic fibers or inorganic fibers.

10. A carbon dioxide recovery concentration device according to claim 9, wherein
the substrate is formed of a porous paper containing plastic fibers, and
the plastic fibers are polyethylene terephthalate (PET) fibers.

11. A carbon dioxide recovery concentration device according to claim 9, wherein
the substrate is formed of a porous paper containing inorganic fibers, and
the inorganic fibers are glass fibers.

12. A carbon dioxide recovery concentration device according to claim 2, wherein
the honeycomb rotor is formed from a sheet having front and back sides,
the non-water soluble carbon dioxide sorption particles are bonded to the front and back sides of the sheet with a heat resistant and waterproof adhesive,
the honeycomb rotor is formed by corrugating the sheet followed by at least one of twisting the sheet and laminating the sheet,
the non-water soluble carbon dioxide sorption particles are formed from a granular ion-exchange resin or an amine system carbon dioxide absorbent, and
the sheet is a metallic foil or a plastic sheet.

13. A carbon dioxide recovery concentration device according to claim 2, wherein
the mixed gas is processed by a water scrubber and a desulfurization facility,
after the water scrubber and the desulfurization facility, the mixed gas is cooled to 20° C. or less and dehumidified by cold heat generated by using a waste-heat absorption refrigerator or a waste-heat adsorption refrigerator, and
after being cooled and dehumidified, the mixed gas is supplied to the honeycomb rotor.

14. A carbon dioxide recovery concentration device according to claim 7, wherein
excess water drains from the honeycomb rotor at an outlet of the first water screen purge zone,
the excess water from the first water screen purge zone is collected and recycled,
a vapor generating tub generates water vapor for introduction into the desorption zone of the honeycomb rotor, and
the excess water is recycled back to at least one of an inlet of the first water screen purge zone and the vapor generating tub.

15. A carbon dioxide recovery concentration device according to claim 6, wherein
said honeycomb rotor comprises a substrate that carries the non-water soluble carbon dioxide sorption particles, the non-water soluble carbon dioxide sorption particles are solid amine particles, and the substrate is formed of a porous paper containing plastic fibers or inorganic fibers.

16. A carbon dioxide recovery concentration device according to claim 6, wherein the honeycomb rotor is formed from a sheet having front and back sides, the non-water soluble carbon dioxide sorption particles are bonded to the front and back sides of the sheet with a heat resistant and waterproof adhesive, the honeycomb rotor is formed by corrugating the sheet followed by at least one of twisting the sheet and laminating the sheet, the non-water soluble carbon dioxide sorption particles are formed from a granular ion-exchange resin or an amine system carbon dioxide absorbent, and the sheet is a metallic foil or a plastic sheet.

17. A carbon dioxide recovery concentration device according to claim 16, wherein the mixed gas is processed by a water scrubber and a desulfurization facility, after the water scrubber and the desulfurization facility, the mixed gas is cooled to 20° C. or less and dehumidified by cold heat generated by using a waste-heat absorption refrigerator or a waste-heat adsorption refrigerator, and after being cooled and dehumidified, the mixed gas is supplied to the honeycomb rotor.

\* \* \* \* \*